United States Patent [19]

Inoue

[11] 4,004,123
[45] Jan. 18, 1977

[54] METHOD OF AND SYSTEM FOR THE CONTROLLING OF AN APPARATUS FOR THE ELECTRIC DISCHARGE MACHINING OF A WORKPIECE

[76] Inventor: Kiyoshi Inoue, 3-16-8 Kamiyoga, Setagaya, Tokyo, Japan

[22] Filed: Aug. 1, 1974

[21] Appl. No.: 493,772

Related U.S. Application Data

[60] Division of Ser. No. 408,382, Oct. 23, 1973, Pat. No. 3,864,541, which is a continuation-in-part of Ser. No. 272,463, July 17, 1972, Pat. No. 3,781,507, which is a division of Ser. No. 19,364, March 13, 1970, Pat. No. 3,686,461.

[30] Foreign Application Priority Data

| Feb. 20, 1973 | Japan | 48-20341 |
|---|---|---|
| Feb. 21, 1973 | Japan | 48-21015 |
| Mar. 3, 1973 | Japan | 48-25832 |
| May 17, 1973 | Japan | 48-55019 |
| July 26, 1973 | Japan | 48-83586 |
| July 12, 1973 | Japan | 48-102208 |

[52] U.S. Cl. ............ 219/69 C; 219/69 M; 219/69 P
[51] Int. Cl.$^2$ .................................... B23P 1/08
[58] Field of Search ............ 219/69 C, 69 G, 69 M, 219/69 P

[56] References Cited

UNITED STATES PATENTS

| 3,365,612 | 1/1968 | Schienholt | 315/119 |
|---|---|---|---|
| 3,454,829 | 7/1969 | Schienholt | 315/175 |
| 3,604,885 | 9/1971 | Inoue | 219/69 P |
| 3,778,579 | 12/1973 | Takanada | 219/69 C |
| 3,781,507 | 12/1973 | Inoue | 219/69 G |

Primary Examiner—Bruce A. Reynolds
Attorney, Agent, or Firm—Karl F. Ross; Herbert Dubno

[57] ABSTRACT

Discrete electric-discharge pulses are applied across a dielectric-swept gap between an electrode and a workpiece by triggering an ON-OFF switch between its conductive and nonconductive states in accordance with parameters of the gap so that per pulse adaptive control of the individual machining discharges is effected. An integrator responsive to the gap current, may be used to operate the switch means which may be turned on upon the detection of a pilot discharge. The number of unsatisfactory discharges is detected and, if this number exceeds a predetermined level, is used to control a gap parameter. The integrator signal may be digitalized for accumulation in a counter controlling pulse duration and other parameters.

8 Claims, 20 Drawing Figures

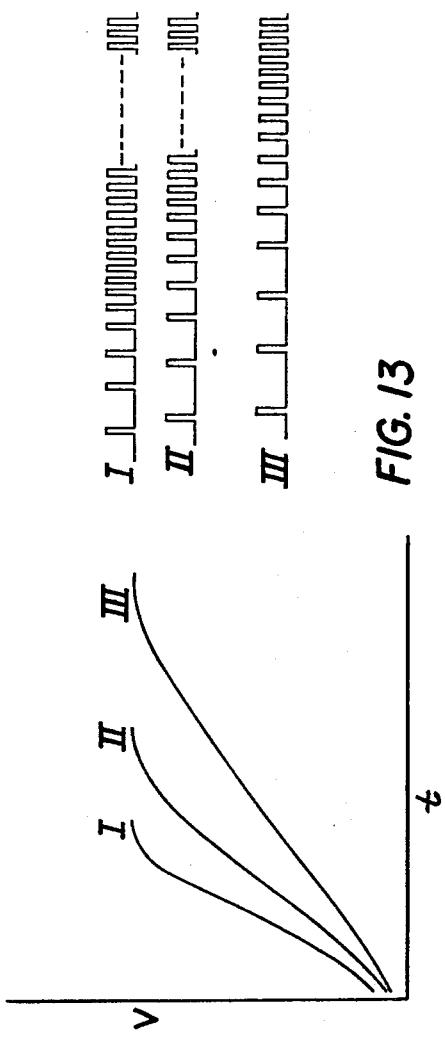
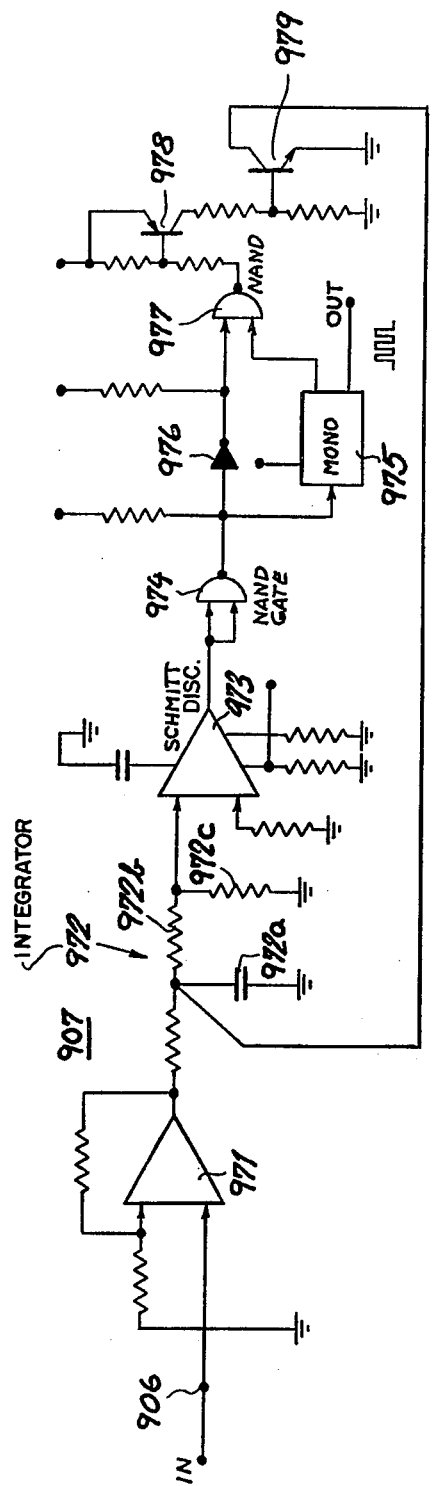
FIG. 13
FIG. 12

4,004,123

METHOD OF AND SYSTEM FOR THE CONTROLLING OF AN APPARATUS FOR THE ELECTRIC DISCHARGE MACHINING OF A WORKPIECE

CROSS-REFERENCE TO RELATED APPLICATIONS

The present application is a division of application Ser. No. 408,382, filed Oct. 23, 1973, now U.S. Pat. No. 3864541, Feb. 4, 1975; which is a continuation-in-part of application Ser. No. 272,463, July 17, 1972, U.S. Pat. No. 3,781,507, Dec. 25, 1973; which is a division of application Ser. No. 19,364, Mar. 13, 1970, U.S. Pat. No. 3,686,461, Aug. 22, 1972; which also dealt with subject matter in part disclosed in application Ser. No. 838,575, filed 2 July 1969 (U.S. Pat. NO. 3,604,885); which is a continuation-in-part of then pending application Ser. No. 682,824, filed 14 Nov. 1967 (U.S. Pat. No. 3,539,755) and as a continuation-in-part of a still earlier application Ser. NO. 493,473 of 6 Oct. 1965 (U.S. Pat. No. 3,360,683). The present application also relates to my U.S. Pat. No. 3,875,374, which makes references to U.S. Pats. Nos. 3,539,755 and 3,536,881 as well as to U.S. Pats. Nos. 3,604,885 and 3,686,461 which issued on applications copending with the parent application hereof.

FIELD OF THE INVENTION

The present invention relates to electric-discharge machining (EDM) systems and, more particularly, to a method of and an apparatus or system for controlling the machining pulses of an EDM apparatus.

BACKGROUND OF THE INVENTION

In electric-discharge machining (EDM), an electrode is spacedly juxtaposed with a workpiece across a gap through which a dielectric liquid is forced while a power supply capable of providing electrical pulses sufficient to effect dielectric breakdown across the gap is connected in circuit with the electrode and the workpiece. With each discharge, a portion of the workpiece is eroded and the detritus is carried away by the dielectric liquid and a nonconductive or low-conductivity state is re-established in the gap.

In early systems of this type, the machining-pulse source was a capacitor connected across the gap and charged by a direct-current source connectable in parallel therewith, the gap breaking down and sustaining the machining discharge when the potential across the electrodes reached the breakdown potential of this gap. These systems had the disadvantages that the discharge-pulse energy varied from discharge to discharge, that short-circuiting prevented the buildup of the capacitor charge while conditions close to short-circuiting prevented significant energy storage in the capacitor, and that significant opening of the gap prevented any discharge whatsoever.

To overcome these disadvantages, switch-pulse systems have been employed wherein an electric-discharge machining current source is connected in circuit with the gap by ON-OFF switch means of an electronic, mechanical or electromechanical type and the switch means is altered in state between its conductive and nonconductive conditions to apply a substantially rectangular waveform discharge pulse across the gap. In prior systems of this gendre, the switch means was controlled by a multivibrator or other ON-OFF signal generator and it was quickly found that the parameters of the electrical pulse had to be established most carefully for efficient machining, especially where electrode wear is to be limited ("no wear") and energy loss is to be a minimum.

Various disturbances arise in electric-discharge machining and, since they have been discussed in some detail in my earlier applications mentioned above, it is necessary only to refer to several of them to place the present developments in EDM pulse control in the proper perspective. It is desired to have the pulses or discharges be of equal energy from pulse to pulse (iso-energy pulses). However, detritus does not always clear uniformly from the gap and residual ionization may make high energy pulses premature from time to time. The tool electrode may approach the workpiece too closely so that a particular discharge energy may be excessive or the gap may be short-circuited in which case the discharge will merely exacerbate the problem. Finally, arcing (continuous discharge) may occur if insufficient gap recovery time is permitted or some other gap parameter is altered. Consequently, with multivibrator or like control of ON-OFF time for the discharge pulse, it was also proposed to vary the pulse duration, the interval between the successive pulses and the pulse height on a per-pulse basis. It was also found, as discussed in the aforementioned applications, that self-adpative control on a per-pulse basis was desirable, in which case means was provided to detect a gap condition indicative over the status of the gap during the next discharge period for controlling the subsequently developed discharge is to amplitude, duration or interval.

OBJECTS OF THE INVENTION

It is an important object of the present invention to extend the principles set forth in the copending applications mentioned above and further improve the discharge machining systems set forth therein.

Another object of the invention is to provide an improved method of controlling the discharge pulses of an EDM system on a per-pulse adaptive basis.

It is also an object of this invention to provide an improved system for machining a workpiece under EDM principles with an improved uniformity, accuracy and efficiency and with reduced downtime or tendency toward interruption of machining.

Still another object of the invention is to provide a more effective parameter-control system for an EDM arrangement.

SUMMARY OF THE INVENTION

These objects and others which will become apparent hereinafter are attained with an EDM system in which, according to an important feature of the invention, the machining current during the discharge is integrated to control an ON-OFF switch means. The integrator may integrate the entire machining current and provide a signal representing the current integral or may provide an integrated current signal other than the machining current signal but traversing the gap as will be apparent hereinafter. An important advantage of this concept is that a truly square wave or rectangular waveform pulse may be applied by the switch means across the gap. The switch means is thus controlled (i.e. shifted between its ON and OFF states) in response to the charge and discharge characteristics of a capacitor connected across the gap and serving as an integrating system without contributing materially to the current flow through the gap during the machining discharge. Thus the capacitor charge and discharge determines the duration of the machining discharge and the discharge repetition rate while the machining energy is supplied directly from a machining power supply through the ON-OFF switch.

Thus a method of controlling the parameters of a train of pulses applied across a dielectric-swept gap between a machining electrode and a workpiece may involve charging a capacitor connected in parallel with the gap at a rate determined by the recovery of the gap from a discharge, and triggering substantially instantaneously the switch means in accordance with the potential across the capacitor while maintaining the current contribution of the capacitor to the machining current pulse at a small fraction of the latter.

According to this aspect of the invention, a system for the electric discharge machining of a workpiece may comprise the electric-current source for producing a rectangular-wave machining current pulse substantially instantaneously upon the triggering of a switch means in circuit with the source and the gap and a capacitor connected in parallel with the gap and chargeable at a rate determined by the recovery characteristics thereof while contributing at most insignificantly to the discharge current pulses.

A discriminator, preferably a Schmitt trigger circuit, is connected to the capacitor and is responsive to the charge level thereof for substantially instantaneously triggering the switch means into one of its conductive or nonconductive states. The Schmitt trigger may have two thresholds for triggering the switch means into one of the states upon the capacitor potential attaining one of the thresholds and into the one state upon the potential falling to the other threshold. A first variable resistor and a diode in one sense is connected as a charging network with the capacitor across the gap while a second variable resistor and a diode poled in the opposite sense is connected in series with the capacitor across the gap as a discharge network. A Zener diode may be applied across the capacitor for limiting the voltage buildup thereacross. The capacitor may be charged with current derived from the machining-current source or from a second source connected across the gap to effect a breakdown thereof. Furthermore, a switch means is preferably connected across the capacitor and is switched into a conductive state when the machining-pulse switch is open circuited to drain the capacitor and prevent residual charge buildup therein.

According to another aspect of the invention, the control system includes means for converting the control signal, e.g. the charge upon the capacitor, into signals for initiating a train of discrete pulses and terminating this train of pulses, the pulse train, in toto, forming the signal applied to the switch means and thereby producing a corresponding discharge current pulse.

According to the invention, a signal representing the gap current and preferably the gap current itself is integrated after initiation of a machining discharge to switch the power supply upon the integral signal attaining a predetermined value. Preferably a low-current high-voltage power supply is applied across the gap to initiate a pilot discharge by breakdown of the dielectric and the machining power supply or low-voltage high-current source is switched on to produce the discharge pulse of generally rectangular waveform upon detection of the pilot discharge. The gap current is thereupon integrated to produce the control signal which turns off the machining current power supply.

The signal representing the gap current may be converted into a train of digital pulses which are integrated, e.g. by accumulation in a capacitor or by accumulation in a digital counter of the solid state type to produce the control signal.

According to another aspect of the invention, the duration of each machining discharge is timed and a number of unsatisfactory machining discharges is counted over a predetermined sequence of machining discharges, either by ascertaining the number of satisfactory discharged or by ascertaining the number of unsatisfactory discharges, and a parameter of the gap is modified upon the count of unsatisfactory machining discharges exceeding a predetermined number.

Since reference is made herein to modification of a gap parameter it is to be understood that such modification may be made in accordance with the techniques described in application Ser. No. 338,849 (U.S. Pat. No. 3,875,374) dealing with EDM parameter control systems. In other words the system of the present invention may be used with an EDM parameter control system as described in the latest application.

The "unsatisfactory discharges" are those having a duration outside a predetermined duration range and, most frequently, those having a duration less than a predetermined minimum duration previously determined to be the minimum effective discharge duration for efficient machining.

The timing of the duration of each machining discharge may be effected by differentiating the machining pulse or the switch-on pulse to trigger a timer into operation, the output of the timer being monitored by a comparator to which a reference time input is supplied, the count being operated by the comparator to respond either to a discharge having a shorter period or a discharge having a longer period. In either case, a logic circuit may be provided to control the pulses transmitted to the counter, an AND gate being used where the counted pulses are to be passed and an IN-HIBIT gate being used where the respective pulses are not to be transmitted to a counter.

The integral control of the present invention has an advantage over gap independent timing of the on-off states of a power switch in that the machining efficiency of the latter may be low because of failure to supply sufficient energy during some pulses and excessive energy for others depending upon the gap conditions. Attempts to apply a series of voltage pulses of fixed width resulting in a series of discharge current pulses of longer and shorter width independently of the gap requirements.

With integral control the repetitive pulse discharges and a variable pulse width which inversely depends upon the varying gap current magnitudes and hence are substantially of equal energy per pulse (energy E being represented by the relationship $$E = \int^t t_o I dt = I \times t).$$

The energy value per pulse is generally maintained in spite of varying gap conditions and the pulse is terminated when the integral reaches a preset level in terms of the control signals and hence in terms of the energy E per pulse. Of course, instead of the change in the current signal for detecting the discharge initiation or gap breakdown a change in the gap voltage may be used to indicate triggering of the discharge.

The integrator control thus provides a succession of discharge pulses with uniform or substantially equal energy.

Furthermore, the integral control system of the present invention, using a pilot pulse triggering of the discharge, creates a current pulse which is exactly in coincidence with the voltage pulse applied by the machining current source. Delays resulting from lack of phase coincidence are thereby eliminated.

The present invention also provides, as has been noted, for the counting directly or indirectly of unfavorable discharge pulses for comparison with a reference value, e.g. a signal representing the occurence of favorable discharge pulses counted separately, to provide a signal which indicates machinig efficiency. It will be immediately apparent that a ratio of 0 unfavorable machining pulses to 100% favorable machining pulses indicates maximum machining efficiency while a large number of unfavorable machining pulses and a small number of favorable pulses will indicate poor efficiency.

The exclusion of unfavorable discharge pulses to the greatest possible extent has been found to be highly desirable for so-called "no-wear" operation in which wear of the tool electrode is to be minimized. With an isoenergy pulse system as described above, it has been found to be advantageous to detect the frequency of unfavorable discharges and thereby ensure that the greatest possible proportion of discharge pulses have a greater magnitude identical to or closely approaching a desired value preselected in accordance with the machine operating mode. Hence in addition to providing the isoenergy system, I make use of logic circuitry to ascertain the frequency of unfavorable pulses and control the parameters of the gap.

According to still another aspect of the invention, the discharge machining apparatus comprises means for deriving an analogous signal representative of an electric current passing through the machining gap, a converter for transforming the analog signal into narrow digital pulses of a pulse train, a counter for counting the digital pulses and a gate circuit operated by an output signal of the counter for terminating each of the gating signals applied to the switch means for triggering the latter on and off. It is important in this latter mode of operation that the counters respond to respective clock pulses generated from separate sources.

Each discharge pulse is thus converted into digital signals controlled by a signal derived from monitoring the gap characteristics and accumulated or integrated. Upon the integrated or accumulated value reaching a predetermined value, switch control results. Accordingly, the pulses have a uniform energy with the width being increased or decreased in dependence upon the variation in gap current and in accordance with varying gap characteristics. A selector switch may be provided to set the counters, which may be conventional digital pulses counters operating off an analogous-digital converter (A/D converter) to set the apparatus for the particular machining operation.

An off-time setting circuit may be provided to reset the gate for triggering the on-off switch according to still another feature of the invention. In accordance with this concept, a timer circuit establishes a checking time following resetting of the gate circuit while a delay circuit is provided to delay the resetting of the gate circuit when the count on the counter reaches a set value before the lapse of the checking time. The latter system is thus capable of ascertaining satisfactory and unsatisfactory pulses for control of gap parameters or of the power supply.

DESCRIPTION OF THE DRAWING

The above and other objects, features and advantages of the present invention will become more readily apparent from the following description, reference being made to the accompanying drawing in which:

FIG. 12 is a circuit diagram for assisting in the explanation of the system of FIG. 11;

FIg. 13 is a graph showing the pulses of the system;

SPECIFIC DESCRIPTION

Figure 1:
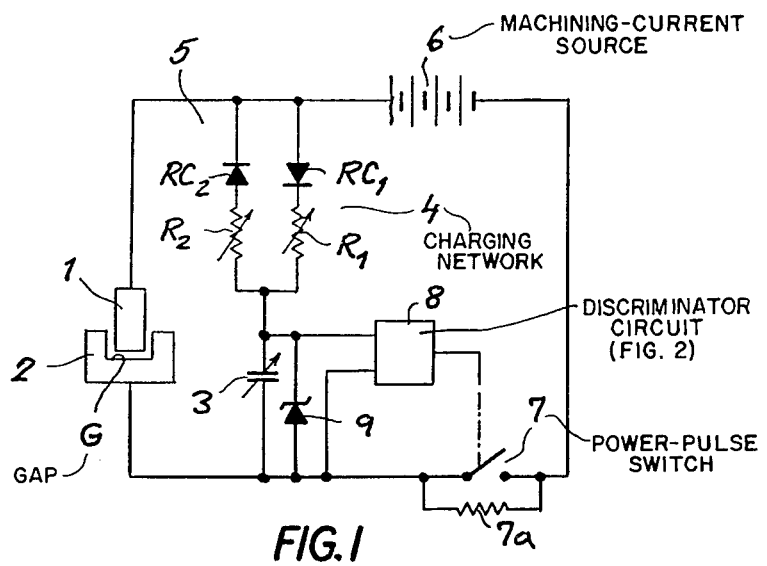
FIG. 1 is a circuit diagram, partially in block form, of an EDM power supply using a low-capacitance capacitor for operating an on-off machining pulse switch according to the present invention.
Figure 1A:
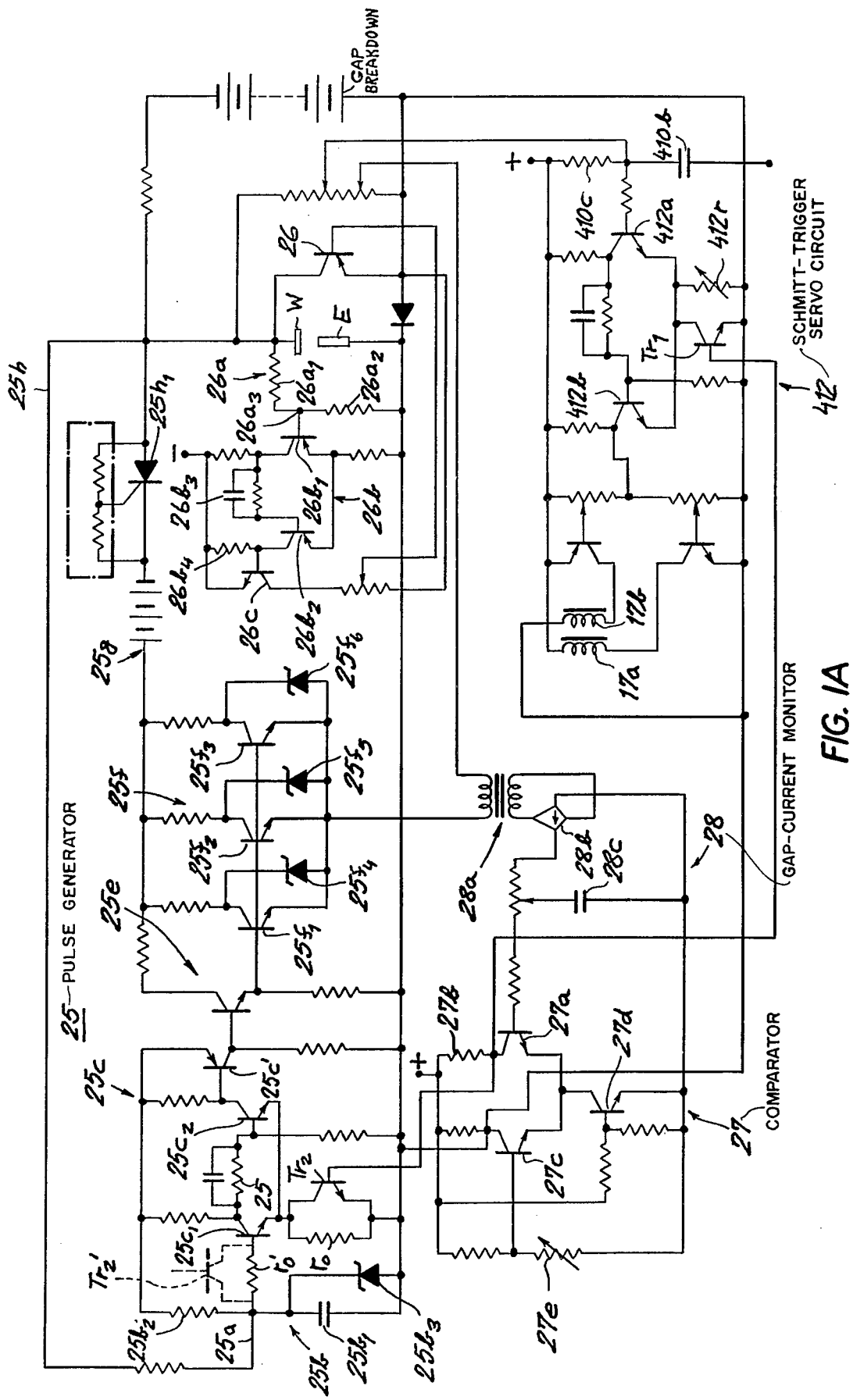
FIG. 1A represents a modification of the system of FIG. 1 but shows circuit components which may be utilized in conjunction therewith, including a separate gap-breakdown current source.

In FIG. 1A I have shown a circuit for the servocontrol of the gap of an electrical discharge machine which operates on the adaptive control principle disclosed in my application Ser. No. 272,463 now U.S. Pat. No. 3,781,507, mentioned earlier and which has circuit elements in common with the pulse-control systems of the present case so that this circuit will be described in some detail herein.

The circuit of FIG. 1A uses an adaptive EDM pulse generator 25 as originally illustrated in my U.S. patent application Ser. No. 838,575 now U.S. Pat. No. 3,604,885, which was copending with and is referred to in said application Ser. No. 272,463, now U.S. Pat. No. 3,781,507. Means 26 is provided for short circuiting the gap through a shunt resistor 26a when the gap voltage falls below a predetermined value, say, 10 volts.

The servocircuit of FIG. 1A has a basic form and operation essentially identical to that shown in FIG. 1 of application Ser. No. 272,463, now U.S. Pat. No. 3,781,507, and is provided with a threshold Schmitt trigger 412 with a variable impedance means, here constituted by a NPN transistor $tr1$ connected across the resistor 412$r$ to control, coupled with the latter, a threshold value of servo-operation in response to a signal derived from a comparator 27 as will be apparent.

A gap-current monitor 28 is provided which includes a differential transformer 28a whose primary winding is connected across a variable tap and a fixed terminal of a gap resistor as shown (the gap resistor is connected in parallel with the gap, i.e. with its outer terminals connected to the workpiece and to the electrode). The secondary winding of this transformer is connected via a full-wave rectifier 28b across an integrating capacitor 28c whose positive terminal is, in turn, connected to the base of a NPN transistor 27a in the comparator 27. Thus it will be apparent that the terminal voltage represents a gap signal indicative of characteristic gap conditions or, in electrical discharge machining, the degree of occurrence of liquid-phase discharges, gaseous discharges, liquid-gas mixed phases discharges, arcing (continuous discharge), short circuiting (no gap), etc.

A higher capacitor terminal voltage indicates a higher proportion of normal discharges occurring while a lower integrating or terminal voltage indicates a condition tending to shift into continuous arcing or short circuiting.

The comparator 27 is here constituted by a differential amplifier which includes a fixed voltage source 27b, NPN transistors 27c and 27d, and an input signal transistor 27a along with resistor connections as indicated in FIG. 1A.

Resistor 27e is variable to establish at the collector of transistor 27c (a predetermined reference voltage depending upon the particular type of machining operation to be conducted and, here, also corresponding to an optimum gap condition for comparison with the collector voltage of transistor 27a which is variable in accordance with the actual gap characteristics. The comparison or difference signal thus derived as fed to the control electrodes of transistor $Tr1$ to vary the collector-emitter conductivity thereof and hence the threshold value of the Schmitt trigger 412 in accordance with and as a function of the magnitude of the comparison signal.

In operation, it will be seen that when machining is carried on in an optimum mode, the integrating voltage of the capacitor 28c is high, applying a greater control signal to the base of transistor 27a whose collector/emitter resistance and hence its collector voltage, is held at a value substantially balancing the collector voltage of transistor 27c. As a consequence, transistor $Tr1$ is held nonconductive or substantially nonconductive and the threshold Schmitt circuit 412 derives the input gap analoge signal across resistor 412$r$, the signal being applied to the first transistor 412a of the Schmitt trigger. In this state, it will be seen that the system tends to hold the machining gap at a minimum preset spacing (with operation of the servomotor as described in application Ser. No. 272,463, now Pat. No. 3,781,507) so as to facilitate metal removal or to allow machining to progress at maximum speed.

When, however, the gap condition worsens or gaseous discharge or a like condition appears, the collector voltage of transistor 27a rises above the collector voltage of reference transistor 27c because of a decrease in the terminal voltage of the gap responsive integrating capacitor 28c. The resulting difference signal from comparator 27 renders the transistor $Tr1$ conductive at a collector/emitter resistance determined by the magnitude of the difference signal. The transition level of Schmitt trigger 412 is lowered and the system is thus controlled adaptively to tend to maintain a relatively wider gap spacing as determined by the lower servo threshold level so that the optimum condition can be restored and development into continuous arcing or a like damaging condition is avoided.

The thresholder controller for the pulse width of the machining current includes a transistor $Tr2$ constituting a variable impedance means provided across the threshold resistor $r_o$ or an input resistor $r_o'$ of a Schmitt trigger pulse shaper in the power supply 25. The differential output of comparator 27 is also applied to the control electrodes of this latter transistor so that, for optimum machining conditions, the machining pulse width is held at a maximum preset value and as the gap condition worsens the pulse width is decreased accordingly to avoid further development into an arcing or like condition.

The power supply shown in FIG. 1A is, as noted, a modification of the system described and claimed in application Ser. No. 838,575 U.S. Pat. No. 3,604,885 and likewise disclosed in application Ser. No. 272,463, now U.S. Pat. No. 3,781,507. This system includes a gap-condition detector connected across the gap and represented by the lead 250 between a capacitor $25b_1$, and a resistor $25b_2$. The capacitor is bridged by Zener diode $25b_3$.

The sensed signal, indicating the gap condition, charges the capacitor $25b_1$ or bucks the charge delivered from some other source so that an integrated signal is applied to the base of transistor $25c_1$ of the Schmitt trigger circuit 25c. The signal applied to the control electrode or base of this transistor is delivered through the resistor $r_o$, which may constitute a variable impedance as previously noted or via a transistor $Tr2'$ whose principal electrodes may be connected in series with the base of transistor $25c_1$ and the integrating network 25b.

The emitter/collector network of the Schmitt trigger transistor $25c_1$ includes the variable impedance system $r_o$ and $Tr2$ controlled by the comparator 27. Between the collector of transistor $25c_1$ and the base of the conjugate transistor $25c_2$ there is provided the usual time constant or delay network $25c_3$. The output of the Schmitt trigger is here derived across the resistor $25c_4$ to which the collector/base terminals of an amplifying and phase-reversal transistor $25d$ is connected.

The integrated signal is applied to the base of the first transistor of the Schmitt trigger $25c$, the thresholds of which are set by the variable-impedance network $r_o$, $Tr2$ as previously described. The output transistor applies its signal to the amplifying and phase reversal transistor $25d$, the latter in turn energizing a switch in two stages as represented at $25e$ and $25f$. The Schmitt trigger $25c$ may be of the type described at page 389 ff of *PULSE, DIGITAL AND SWITCHING WAVEFORMS*, McGraw-Hill Book Co. 1965, and acts as a discriminator converting the level of the input analog signal of the integrating circuit $25b$ to a digital output represented by the two stages of the Schmitt trigger. The two-stage switch comprises a transistor $25e$ whose emitter is connected in parallel with the bases of the transistors $25f_1$, $25f_2$, $25f_3$, etc., the principal electrodes of these latter transistors being connected in parallel between a power source $25g$, represented as a battery, and the electrode gap in series with the tool electrode E and the workpiece electrode W.

Zener diodes $25f_4$, $25f_5$, and $25f_6$ are connected across the emitter/collector terminals of the power transistors $25f_1$, $25f_2$ and $25f_3$ to prevent overloading thereof. The machining current is, of course, a function of the number of power transistors of this latter network which are connected in parallel between the source and the electrodes. An electronic switch $25h$ is also connected in series with the direct current source $25g$ and is represented as a silicon controlled rectifier $25h$, whose gate is triggered to turn on the power circuit.

As noted earlier, a shunt 26 is provided to short circuit the electrodes E, W as controlled by a gap voltage detector $26a$, consisting of a pair of resistors $26a_1$, $26a_2$, forming a voltage divider, the tap $26a_3$ of which is applied to the base of a transistor $26b_1$ forming a part of a Schmitt trigger circuit $26b$ as descrribed in *PULSE, DIGITAL AND SWITCHING WAVEFORMS* cited earlier. Between the base an collector of second or conjugated tranistor $25b_2$ there is provided a time delay or time-constant network $26b_3$. The output of the Schmitt trigger, which digitally controls the shunting operation, is developed across the resistor $26b_4$ and is applied to the base/collector terminals of an amplifier and phase reversal transistor $26c$. The output of the latter is applied via a potentiometer $26d$ to the base of the transistor $26e$ whose principal electrodes are connected in shunt across the workpiece electrode W and the tool electrode E. When the gap voltage drops below 10 volts, the Schmitt trigger $26b$ reverses in state and, via a transistor $26c$, renders a transistor $26e$ conductive to short circuit the gap.

In FIG. 1 I have shown, somewhat more diagrammatically, a basic circuit according to the principles of the present invention wherein a capacitor is provided across the gap to control an on-off switch means in accordance with the present invention without a material contribution to the gap current from the capacitor. The capacitor here acts, as in the embodiment of FIG. 1A in which it is part of an integrator circuit, as the sensing element.

In the system of FIG. 1, the tool electrode 1 and the workpiece 2 defines a gap G which, as in the case with the gap of FIG. 1A, may be flooded with dielectric using a circulation system of the type illustrated in FIG. 1B to be described subsequently. Across this gap G there is connected a charge/discharge capacitor 3 shown to be of the variable capacitance type and effectively connected in parallel with the machining gap. The capacitor 3 may be charged through a resistor $R_1$ and a rectifier diode $RC_1$ forming a charging network 4 and disposed between the positive terminal of a machining current source 6 represented as the battery and a negative terminal thereof. Since the electrode 1 and the workpiece 2 are respectively connectably to the positive and negative terminals of the direct current machining source 6, the network 3, 4 lies directly in parallel with the gap. The capacitor 3 may discharge through a network 5 consisting of a variable resistor $R_2$ and a rectifier diode $RC_2$ poled oppositely to the diode $RC_1$ described earlier. The discharge circuit is closed through the gap G.

The machining-current source 6 lies in series with a switch 7 which is shown as a mechanical switch merely for purposes of illustration. In practice, the switch 7 may be a transistor or transistor bank as described for the switching circuit 25 of FIG. 1A and is also illustrated diagrammatically in FIG. 1B. It also may be constituted by a thyristor such as that shown at $25h_1$ in FIG. 1A, or electron tubes or other high-speed on-off switch means.

Figure 1B:
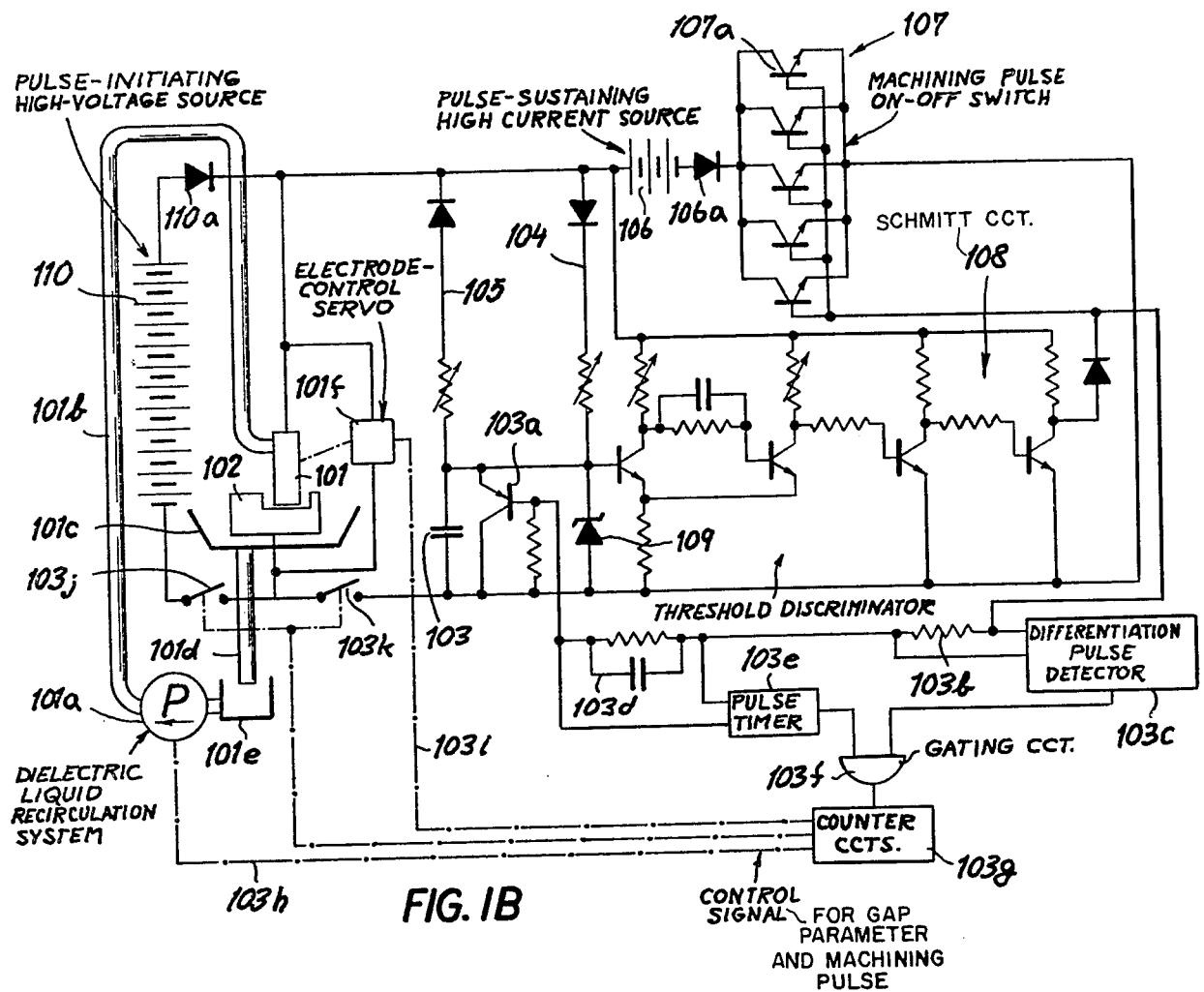
FIG. 1B is a circuit diagram illustrating another modification of the circuit of FIG. 1.

The direct current source 6 may be constituted as a single source of machining current, in which case the switch 7 may have a high-resistive $7a$ thereacross to enable the capacitor 3 to be effective, or may be divided into two sources in parallel with one another as illustrated in FIG. 1B. In this case, the machining current source is a low-voltage source designed to provide a high current for machining at, for example, a voltage level of less than 100 volts and sufficient to sustain the discharge over the duration of the machining poles but insufficient to initate this discharge by breakdown of the gap. The high-voltage low-current source is designed to provide a voltage sufficient to initiate the discharge, for example several hundred volts, but does not make a material contribution to the machining current pulse. The high voltage or discharge-initiating source is connected in parallel with the voltage source 6 and across the gap. The switch 7 is located in series with the low voltage machining-power source.

The circuit represented in FIG. 1 comprises a discriminator circuit 8 (FIG. 2) adapted to respond to the capacitor 3 and discriminate between charge and discharge voltages to control the on and off operation of the switch 7.

Figure 2:
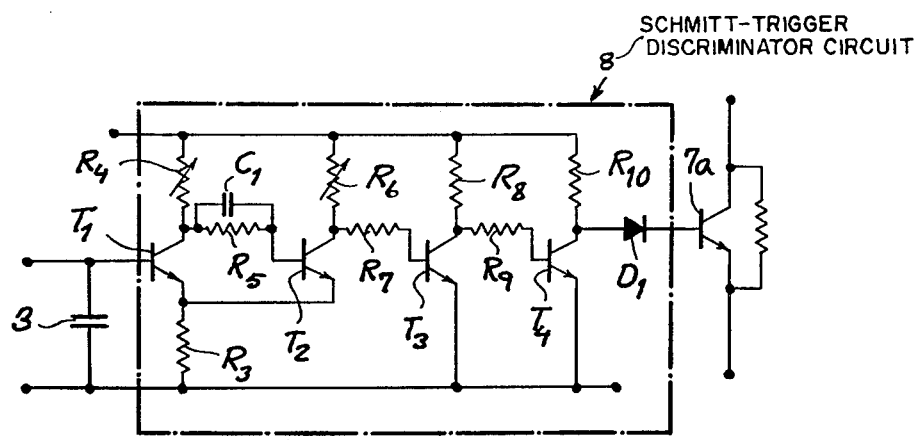
FIG. 2 is a diagram of a Schmitt-trigger discriminator for use in the power supply system of FIG. 1 and elsewhere in accordance with the present invention.

From FIG. 2 it will be apparent that the discriminator 8 is a Schmitt-trigger circuit of the type described generally in connection with FIG. 1A and as also discussed in *PULSE, DIGITAL AND SWITCHING WAVEFORMS* cited earlier.

The circuit of FIG. 2, in which the capacitor 3 has been shown diagrammatically, comprises an input transistor $T_1$ of the NPN type whose base is connected to one terminal capacitor 3 and whose emitter is connected via the bias resistor $R_3$ to the negative bus of the system. The positive bus is connected by a threshold-setting resistor $R_4$ to the collector of transistor $T_1$.

A signal-shaping network consisting of a capacitor $C_1$ in parallel to a resistor $R_5$ is connected between the collector of transistor $T_1$ and the base of a transistor $T_2$ of the NPN type whose emitter is tied to the emitter of transistor $T_1$. A second threshold-setting variable resistor $R_6$ is provided between the positive bus and the collector of transistor $T_2$ which is also connected via a resistor $R_7$ to the base of an amplifier transistor $T_3$. This NPN transistor has its collector connected by a bias resistor $R_8$ to the positive bus and by a resistor $R_9$ to the base of an output transistor $T_4$ while its emitter, like the emitter of transistor $T_4$, is connected to the negative bus. The bias resistor $R_{10}$ is connected between the positive bus and the collector of NPN transistor $T_4$ whose output is applied via a diode $D_1$ to the base of a transistor $7a$ constituting an electronic switch adapted to be provided at the switch 7 of FIG. 1. The Schmitt trigger circuit 8 of FIG. 2 thus has a pair of conjugate transistors $T_1$ and $T_2$ and an amplifier circuit having transistors $T_3$ and $T_4$ which amplify and invert the outpt of the Schmitt circuit.

A Zener diode 9 is connected across the terminals of the capacitor 3 (FIG. 1) to protect the latter against excessive voltage levels. After a discharge has terminated at the machining gap G, the capacitor 3 begins to charge through the network 4 at a rate determined by the resistance of resistor $R_1$ and the capacitance C of the capacitor 3 along the curve represented at $R_1C$ in FIG. 3 in which the capacitor voltage $V_c$ is plotted along the ordinate against $t$ (time) plotted along the abscissa. Since the charging is effected from the source 6 through the ohmic resistance of switch 7 in the off state, no machining pulse passes during this period. When the charge on the capacitor reaches a predetermined level, the state of the Schmitt circuit will invert and the blocking transistor $T_1$ will be rendered conductive while transistor $T_2$ is switched to a nonconductive state from its previous conducting condition. Transistor $T_3$ is thereby turned on and transistor $T_4$ is turned off to develop a collector signal which turns the switch 7, $7a$ on, allowing the source voltage to be applied directly to the machining gap.

Since the capacitor is always in circuit (parallel) with the machining gap, its charging rate is, of course, dependent upon the gap deionization characteristics or gap impedance. When switch 7 is turned on, the discharge proceeds with a substantially rectangular wavefront (see the voltage V and current I graphs of FIG. 3) and machining takes place.

Figure 3:
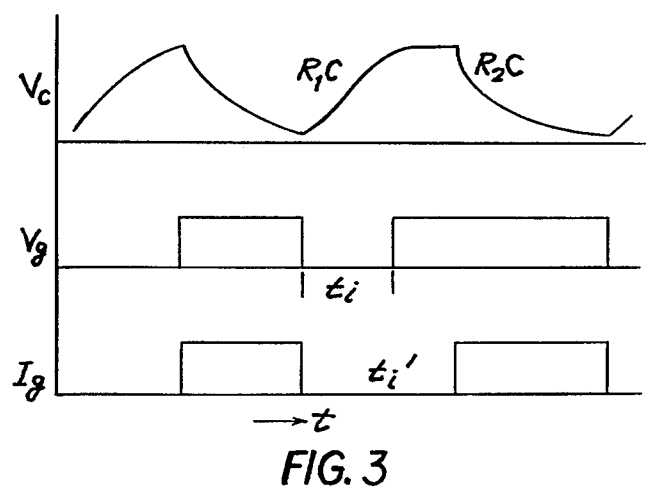
FIG. 3 is a graph showing waveforms of the system of FIG. 1.

From FIG. 3 it will be evident that the time interval $t_i$ and $t_i'$ between machining discharges varies in response to the dielectric recovery characteristics of the gap which controls the instant of discharge initiation along the capacitor-charge accumulation as described. When the discharge begins, the capacitor 3 begins to discharge through network 5 with its terminal voltage dropping along the curve $R_2C$ reached in FIG. 3. This discharge characteristic is likewise variable in accordance with the gap condition through which the capacitor discharges.

During the discharge of capacitor 3, discriminator circuit 8 maintains its inverted state so that switch 7 is held on to maintain the discharge current through the gap. The discharge current across the gap from source 6 includes a contribution from the capacitor 3 but the latter is negligibly small since the capacitor may have a small capacitance of up to several microfarads and is in series with the resistor $R_2$. As a consequence the gap current is substantially constant notwithstanding the discharge of capacitor 3.

When the capacitor voltage drops to a predetermined level as established by the threshold of discriminator 8, the latter switches to its original state to turn switch 7 off, thereby terminating a discharge cycle of the machining system. The resistors $R_4$ and $R_6$ set the upper and lower phase-inverting levels of the discriminator and upon reversal of state, the discharge across the gap is terminated. The machinging current pulse width is thus dependent upon the capacitor discharge time and hence decreasing the resistance of discharge resistor $R_2$ will narrow the pulse width whereas increasing it will lengthen the pulse width. The operating conditions for particular machining operations with rectangular wave discharges may thus be set as required. Of course, since the pulse width is a function of the gap condition, the setting of resistance $R_2$ will have little effect except during stabilized machining when the pulse duration is substantially constant. As soon as an unstable gap condition develops, the adaptive characteristics of the present system operate to place the pulse width under the control of capacitor 3. After the termination of the machining discharge, capacitor 3 charges again in accordance with the recovery characteristics of the gap, i.e. more rapidly or more slowly depending upon whether the gap recovery is fast or slow. The cycle is then repeated.

FIG. 3 also shows the phase relationship between the waveform C across the capacitor 3, the voltage pulse V applied across the machining gap and the discharge current pulse 1 therethrough.

The capacitor 3 thus has a terminal voltage which varies in accordance with changes in the machining-gap conditions and is used, through the discriminator circuit, to turn the switch 7 on and off thereby impressing the voltage across the machining gap for a duration determined by the on time of the switch 7. This system minimizes the interval between successive pulses to that which is required for restoration of a gap condition enabling the next machining pulse to be effective. The average current is thus maintained at a high level automatically without permitting a damaging arc discharge.

It is important to observe that in the present system the discharge is not derived from the capacitor but is delivered directly by the voltage source 6 of predetermined output characteristics, simply by switching the latter on and off. The discharge current pulses thus have the rectangular waveform described in conjunction with FIG. 3. Adjustment of the resistors 4 and 5 varies the slope of curves $R_1C$ and $R_2C$ of FIG. 3 and thus allows the charging rates to be set at the desired levels for low wear machining and other machining modes.

In FIG. 1B, I have shown a system which is generally similar to FIG. 1 but employs additional circuit elements to be described hereinafter. In all of the embodiments hereinbefore and hereinafter described, the tool electrode 101 may be tubular and can be supplied with dielectric from a pump 101a by a pipe 101b, the dielectric overflow being collected in a trough 101b, the dielectric overflow being collected in a trough 101c connected by a pipe 101d to a reservior 101e provided with a filter or the like. The pump 101a draws the dielectric from this reservoir. In addition, the servosystem 101f is connected with the electrode 101 (or the workpiece 102) and can respond to the gap characteristics in the manner described in my application Ser. No. 272,463, now Pat. No. 3,781,507.

The system of FIG. 1B comprises the machining current source 106 connected in series with a rectifier diode 106a and an electronic switch 107 having ganged transistors 107a of the type shown in FIG. 1A and controlling the level of the machining current in accordance with the number of transistors which are effective. A Schmitt trigger circuit 108, identical to that of FIG. 2, is connected across the sensing capacitor 103 and the Zener diode 109 in the manner previously described. In addition, a transistor 103a has its emitter collector terminals connected to the output of the discriminator so as to render the transistor 103a conductive when the switch 107 becomes nonconductive and drains the capacitor of any residual charge. The charging network 104 and the discharging network 105 of this embodiment correspond to networks 4 and 5 previously described.

The output of the threshold discriminator 108 is also applied through a sensor resistor 103b having a differentiator network 103c connected thereacross to indicate the leading edge of the signal initiating the machining pulse. A pulse timer 103e provided with a suitable clock (not shown) is connected across an integrating network 103d receiving the control signal so that a gating circuit 103f passes signals reaching each discharge pulse to store, at counter 103g, a signal representing the number of satisfactory pulses or the number of unsatisfactory pulses as will be described in greater detail hereinafter. The counter 103g produces a control signal which may be applied to the dielectric recirculation system as represented at 103h or to the servocontrol system as represented at 103i to adjust the gap parameter when the number of unsatisfactory pulses in a given sequence exceeds a predetermined minimum. The control signal may also be applied to a switch 103j, 103k cutting off machining operation should the ratio of unsatisfactory pulses to satisfactory pulses be intolerably high. The discharge is initiated by a pilot voltage source 110 through a rectifier diode 110a. The system of FIG. 1B, of course, operates similarly to that of FIG. 1.

Figure 4:
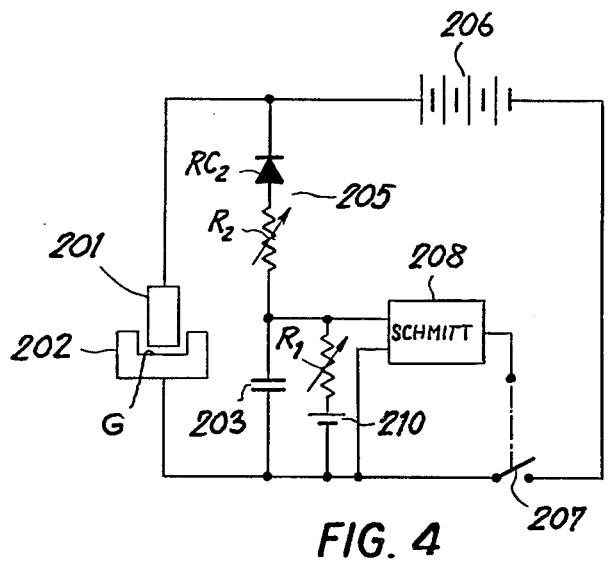
FIG. 4 is a circuit diagram, partially in block form, representing another modification of the capacitor control system of the invention.
Figure 5:
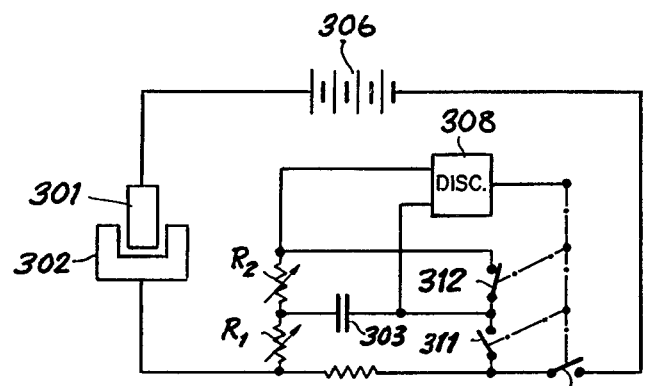
FIG. 5 shows a circuit operating generally similarly to the system of FIG. 1 but using a separate switch for draining the capacitor.

FIG. 4 shows an embodiment of the invention in which the capacitor 203 is connected in series with a discharge network 205 containing the resistor $R_2$ and the diode $RC_2$ across the gap formed by the electrode 201 and the workpiece 202. A separate direct current source 210 is provided in series with a variable resistor $R_1$ across the capacitor 203 which controls a disciminator 208 having the circuit configuration of FIG. 2. The discriminator 208, of course, operates the on-off switch 207 in series with the machining-current power supply 206. The gap G between the electrodes 201 and 202 also controls the charging rate of capacitor 203 in spite of the fact that it is charged by a second DC source 210. In this circuit as well, a swtich may be connected across the capacitor 203 to turn on when switch 207 turns off and thereby drain the capacitor upon its discharge state upon the opening of power switch 207 and thereby eliminate charging time variation due to such residual charge. A switch of this type has been illustrated in the system of FIG. 5 in which the capacitor 303 has the control function as described for the low-capacitance capacitors of FIGS. 1, 1B and 4. The electrode 301 is connected to the machining power supply 306 while the on-off switch 307 in series therewith is supplied by the discriminator 308 (see the circuit of FIG. 2) in the manner previously described. The capacitor 303 may be charged in series with a switch 311 and the resistor 301 and discharged when switch 312 is closed through resistor $R_2$. The switches 311 and 312 are operated by the discriminator 308 to turn off and on, respectively, when the switch 307 is turned on by the discriminator network 308. Consequently, when the discriminator circuit 308 turns on switch 307 a voltage develops across the machining gap from the source 306 and initiation of the discharge enables the capacitor 303 to begin to charge to the resistor $R_1$ with its terminal voltage increasing at a rate determined by the resistance of resistor $R_1$ and the capacitance C of the capacitor 3 and the gap condition. If the gap has a lower impedance with a larger machining discharge current, the capacitor charges at a faster rate whereas with a smaller discharge current a decreased charging rate results.

The capacitor voltage across capacitor 303 is monitored by the Schmitt trigger circuit and, upon obtaining a preset value set by a reference resistor of this circuit, the Schmitt trigger provides a switching signal to turn switch 7 off and terminate th preceding machining discharge. The switch 311 is thereby turned off and the switch 312 turned on to enable discharge through the resistor $R_2$. The capacitor 303 discharges and, when its terminal voltage drops to a lower level, the discriminator 308 threshold is attained to invert the discriminator and cause the switch to turn on and enable the voltage from source 306 to be applied across the gap and trigger the subsequent discharge.

Figure 6:
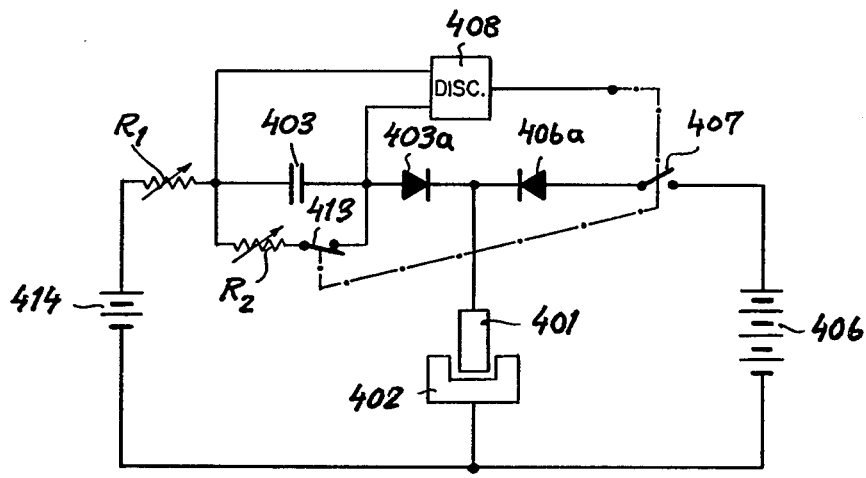
FIG. 6 is a circuit diagram of an EDM power supply embodying the feature of FIG. 5 and in addition having a separate source for charging the capacitor.

In FIG. 6 I have shown another embodiment of the invention wherein the capacitor 403 is charged through the variable resistor $R_1$ from a source 414 other than the source 406 supplying the discharge energy. A switch 413 is series with a variable resistor $R_2$ is connected across the capacitor 403 and the latter lies in series with the diode 403a in circuit with the gap formed between the tool electrode 401 and the workpiece 402. The switch 413 is coupled with the power switch 407, in series with the machining current source 406 and a diode 406a, for operation by the Schmitt discriminator circuit 408 connected across the capacitor 403. The switch 413 operates oppositely to the switch 407.

In this circuit, after the switch 407 is rendered conductive and the switch 413 is turned off, no charging occurs until after a machining discharge is initiated at the gap. During this period, the nonconductive state of the gap open-circuits the capacitor charging network. When the discharge is initiated at the gap, the latter serving as a switch, the capacitor 403 is charged from source 414 at a rate determined by the resistance of resistor $R_1$ and the gap impedance. While the capacitor 403 is charged, discharge current passes through the machining gap from the power source 406 and, when the capacitor voltage reaches a predetermined magnitude set at the discriminator 408, the latter inverts (as described in connection with FIG. 2) to turn off the switch 7 and terminate the discharge pulse. Simultaneously switch 413 is turned on to discharge the capacitor 403 through the resistor $R_2$.

Consequently, if there is a delay in the gap recovery, there will be a corresponding delay in discharge of the capacitor since the voltage from source 414 will continue to be applied to the capacitor 403. With a more rapid gap recovery, the source 414 is cut off from the capacitor 403 at an earlier instant to reduce the discharge time since then only the stored charge need be dissipated. When the capacitor 403 terminal voltage drops to a lower predetermined level, the discriminator circuit 408 again responds to turn switch 407 on and switch 413 off to initiate the next pulse discharge. As in the embodiment of FIG. 5, the circuit of FIG. 6 uses a capacitor connected in series with the machining gap and thus charging and discharging characteristics control the switching of the machining energy. The machining pulse interval, pulse width and repetition rate are thus accommodated to the varying gap conditions and, since the power pulse is switched, a generally rectangular waveform is produced.

Figure 7:
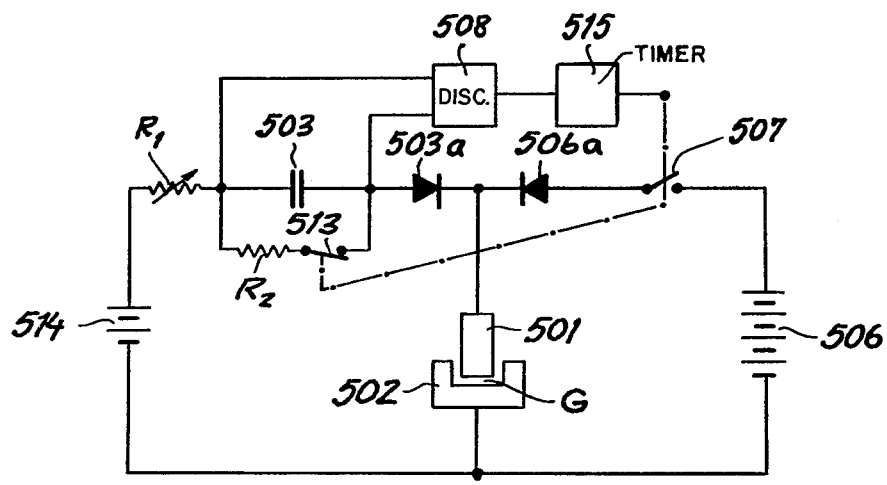
FIG. 7 is a circuit generally similar to FIG. 6 but containing an additional feature of the invention.

In FIG. 7 there is shown a modification of the system of FIG. 6 wherein a timer 515, constituted by a monostable multivibrator is interposed between the discriminator 508 and the switch 507. Here the electrode 501 and the workpiece 502 define the machining gap G which receives a machining discharge from a machining current source 506 via the switch 507 and a diode 605a while the auxiliary source 514 can charge the capacitor 503 through the variable resistor $R_1$. The discharge resistor is represented at $R_2$ in series with the switch 513 ganged with the switch 507 as described in connection with FIG. 6, a diode 503a being interposed between rectifier 503 and the tool electrode 501.

In this system, the discriminator 508 responds to the attainment of a predetermined level of the terminal voltage of capacitor 503 to actuate the timer 515 to turn and hold the switch 507 off and the switch 513 on for a given period. The capacitor is charged during the machining operation and turns the switch 507 off to terminate the gap discharge pulse. At this instant, the timer is energized and upon lapse of a predetermined time thereafter returns the switch 507 to its conductive condition. While the switch 507 is off, switch 513 is on to permit the capacitor 503 to discharge through its resistor $R_2$. Only the charging portion of the capacitor cycle is thus provided to control the switch.

Figure 8:
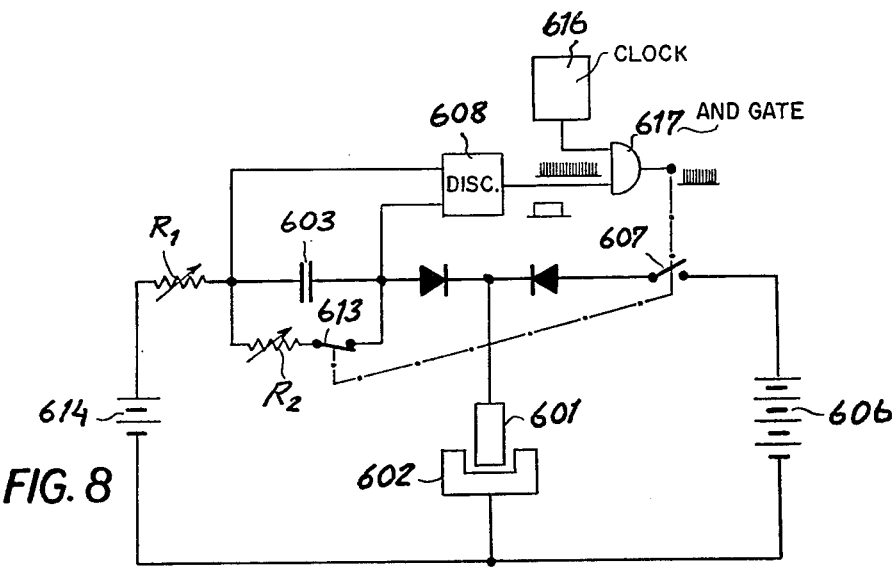
FIG. 8 is a capacitor control circuit according to the invention in which the ultimate control signal is a train of discrete or digitalized pulses.

In the modification of FIG. 8, in which the elements 601 through 603, 606–608, 613 and 614 have the same structure and function as the corresponding elements 501 through 503, 506–508, 513 and 514, comprises a clock pulse power supply 616 and an AND gate 617 at the output of the discriminator 608 to operate the switch 607 to pulse the latter. The discharge energy is thereby controlled in the form of a succession of time-spaced trains of brief pulses. The discriminator 8 may directly energize a unit-pulse generator, e.g. an oscillator, in which case the gate is omitted.

In all of the embodiments of FIGS. 1 through 8, the capacitor is connected in series or parallel with the machining gap and its charging and discharging process provides the switching signals for an on-off switch. The capacitor is therefore used to control the timing of the pulses and the discharge energy derives from a source other than the capacitor.

Figure 9:
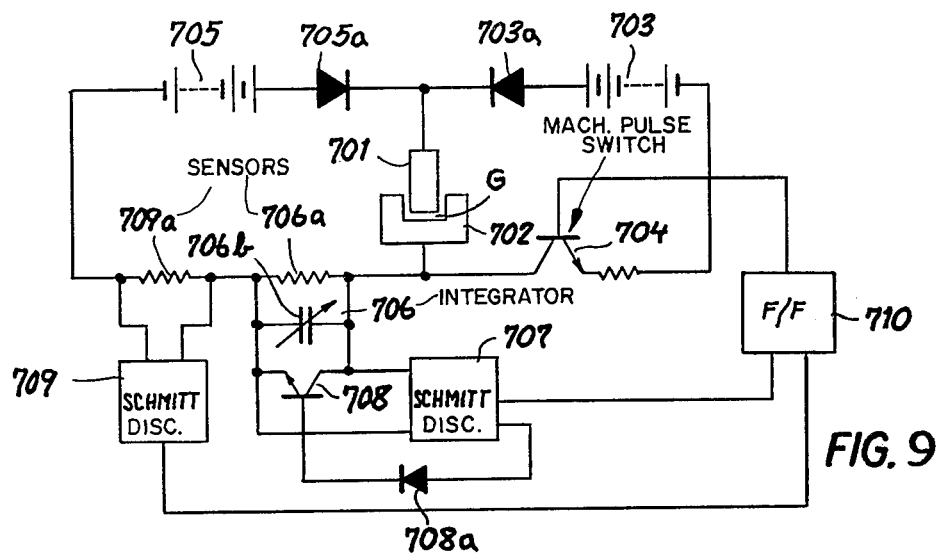
FIG. 9 is a circuit diagram of an EDM control system in which the control signal is derived by integrating the current through the discharge gap from the breakdown-voltage source.

In FIG. 9 I show a circuit using integral control as will be apparent. The circuit basically comprises a tool electrode 701 and a workpiece 702 defining the machining-pulse power supply 703 in series with a diode 703a and an electronic switch 704 here shown as an NPN transistor for convenience. As in the previous embodiments, when the switch 704 is triggered into an on state, the discharge current passes substantially instantaneously and is cut off substantially instantaneously when the discharge is terminated. Any of the switch systems previously described may be used for the electronic switch 704.

A separate voltage supply 705 in series with a diode 705a is connected across the gap to trigger the discharge or to supply sufficient current to detect a predischarge phenomenon even where source 703 is cut off from the gap in the off condition of switch 704. The circuit of DC source 705 includes an integrating circuit 706 consisting of a resistor 706a in parallel with a capacitor 706b, the integrator lying acrosss the emitter/collector terminals of a transistor 708. A Schmitt-trigger discriminator 707 (see FIG. 2) produces an output when the capacitor terminal voltage reaches the predetermined reference or inversion voltage of the Schmitt circuit. The signal turns on the transistor switch 708 whose emitter/collector terminals are connected across the integrating capacitor and thereby discharge the latter.

A second discriminator circuit 709, likewise a Schmitt trigger as shown in FIG. 2, detects the energization of the gap discharge by responding to the increased voltage level tapped across a resistor 709a in series with the source 705. A gating circuit 710 is operated by the discriminators 707 and 709 to provide a gating pulse to the switch 704 and trigger the latter. The gating circuit 710 may be flip-flop or bistable multivibrator as described in PULSE, DIGITAL AND SWITCHING WAVEFORMS discussed earlier. The integrator 706 and discriminators 707 and 709 of the gating circuit 710 thus form the on-off control circuit for the switch 704. The control signal for the transistor 708 is applied via a diode 708a.

Before the discharge is initiated, the switch 704 is in an off condition so that the output voltage from the power source 703 is ineffective across the machining gap. The high voltage output from source 705 is, however, always effective across the gap (although this source is incapable of making a significant contribution to the machining current). When the high voltage initiates a discharge, the discriminator 709 responds to the small circuit current indicative of the pilot discharge and produces an output to the gating circuit 710 signaling the existance of a gap condition capable of effecting machining. The switch 704 is turned on rendering the machining voltage from source 703 effective and the machining discharge is thus created as soon as breakdown of the gap by source 705 has been initiated.

The current passing through power circuit 705, 705a, 701, 702, 706 and 709a is integrated by the integrator network 706 to develop thereacross an integrated value represented by the terminal voltage of the capacitor 706b. When the voltage reaches a predetermined level established by the Schmitt trigger 707 connected across the integrator 706, the output of the discriminator circuit 707 applies a signal to the flip-flop 710 to turn switch 704 off and terminate the machining discharge. An output pulse from the discriminator 707 is also applied to the switch 708 to drain residual charge from the capacitor and permit the process to be repeated. The pulse discharges have a variable pulse width which depends inversely on the gap current and hence have substantially equal energy in spite of varying gap conditions. The energy value may, of course, be adjusted, by setting the current magnitude and by varying the characteristics of capacitor 706b in the manner previously described.

Instead of current signal detection of the discharge iniation, a change in the gap voltage may be monitored. In this case, the discriminator 709 would be connected across the gap to respond to the voltage drop as the discharge is initiated.

Figure 10:
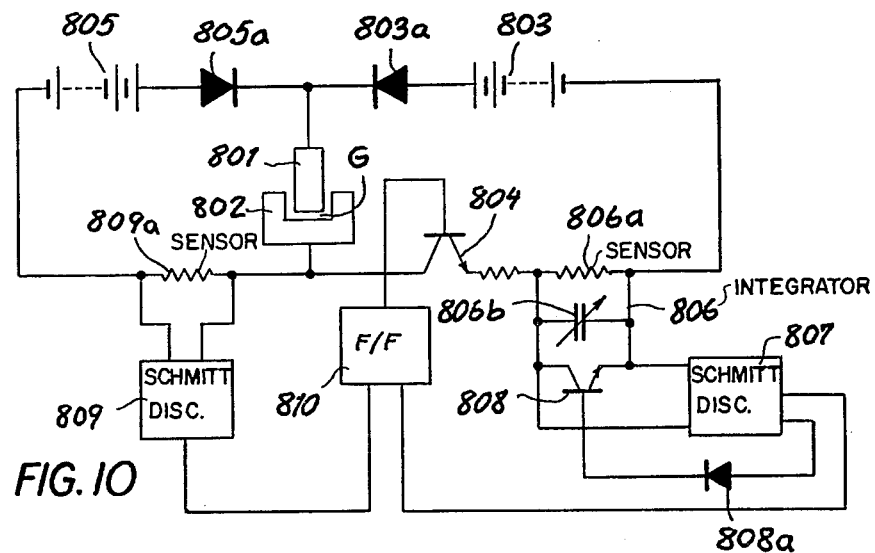
FIG. 10 is a circuit diagram similar to FIG. 9 but showing the system in which the integrated current is derived from the machining-current source.

In FIG. 10 there is shown a modification of the system of FIG. 9 in the sense that the integrator circuit 806, consisting of the parallel-connected resistor 806a and capacitor 806b is provided in series with the electronic switch 804 and the machining power source 803 and its diode 803a across the workpiece 802 and the tool electrode 801 defining the gap G.

As in the embodiment of FIG. 9, however, the discharge-initiating source 805 (pilot-voltage source) is connected across the electrodes 801, 802 in series with the rectifier 805a and the sensing resistor 809a of the Schmitt trigger discriminator 809. The output of the discriminator 807, which responds to the integral signal appearing across the capacitor 806b, is applied to the gating circuit 810 which may be a flip-flop as previously indicated. Another output from the Schmitt-trigger circuit 807 is applied via the diode 808a to the base of the capacitor-shorting transistor 808.

The system of FIG. 10, therefore, differs from that of FIG. 9 in that in the former the integrated signal was a current representing the gap condition and derived from a source other than the machining current source. In the instant embodiment, the discharge is triggered in response to a current from an auxiliary source but is turned off in response to the direct integral of the machining current. Otherwise the system of FIG. 10 operates in the same manner as that of FIG. 9.

Figure 11:
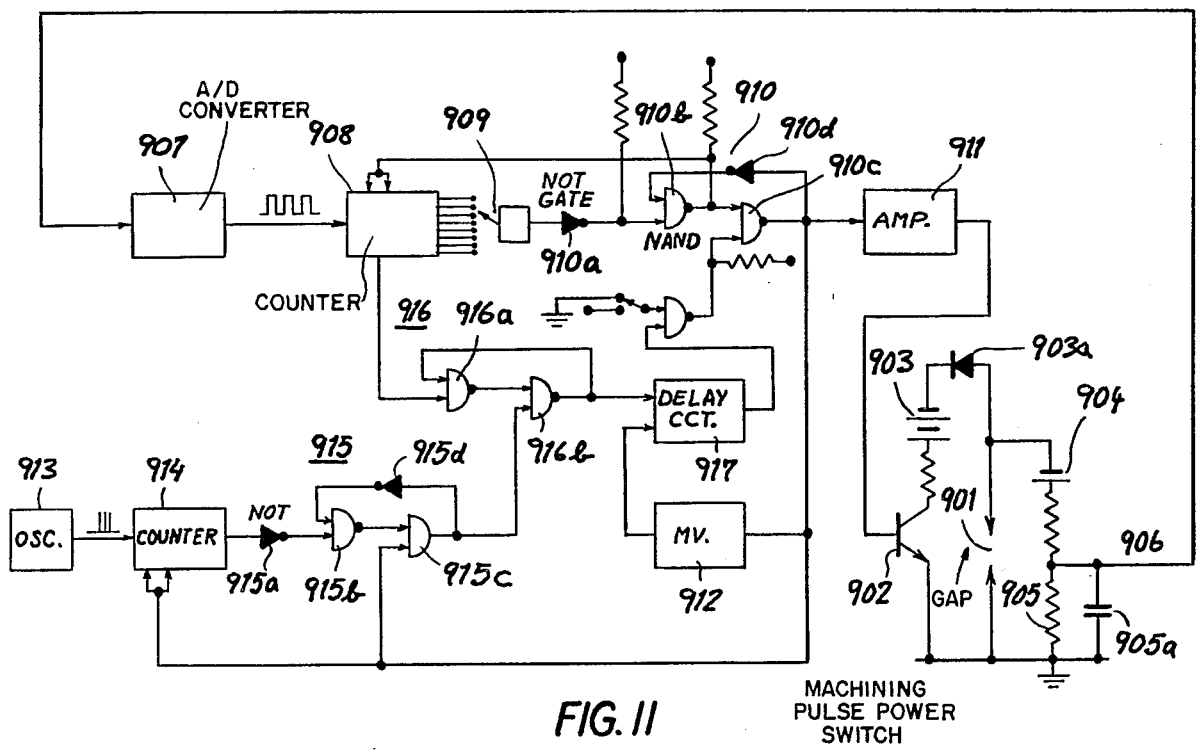
FIG. 11 shows a digital system according to the invention for controlling on and off time.

FIGS. 11 through 13 illustrate another concept embodying the basic principles set forth earlier and characterized by digital control.

More specifically, the circuit of FIGS. 11 and 12 comprises an electrode and workpiece system, represented generally at 901 and defining a discharge-machining gap to which a current pulse is applied by the on/off operation of a switch means represented diagrammatically as a transistor 902 whose emitter-collector terminals are in series with the machining power source 903 and a diode 903a as previously described. In this system there is also provided a device for monitoring the condition of the gap or a so-called gap sensor including an auxiliary voltage source 904 in series with a voltage divider 905, a portion of which is applied across a capacitor 905a. The result is a terminal voltage at 906 which is applied as an input to converter 905, a portion of which is applied as an input to a converter 907 detailed structurally in FIG. 12. The analog signal, of course, is representative of gap current and the magnitude of the latter is a function of the gap characteristics.

The converter 907 is designed to transform the analog signal into a train of digital pulses of, for example, a pulse width of 1 to 2 microseconds. Consequently, it is an analog/digital converter (A/D converter) and may be of conventional design.

The particularly advantageous A/D converter 907 (FIG. 12) comprises an amplifier 971 to intensify the analog signal at terminal 906, and an integrating network 972 consisting of a capacitor 972a and resistors 972b and 972c. The integrating capacitor has its output applied to a bistable device 973 such as a Schmitt trigger (FIG. 12) whose state depends upon the terminal voltage of the capacitor 972 in the manner previously described. The output of the bistable device 973 is designed to invert through a NAND gate 973 providing an output for actuating a monostable multivibrator 975 (PULSE, DIGITAL AND SWITCHING WAVEFORMS) to produce signal pulses at the OUT terminal as shown. The output of the inverter 974 is also applied to a NOT gate 976 and then through the latter to a NAND gate 977 receiving an output from the monostable multivibrator 975. The output of the NAND gate 977 is inverted by an amplifying transistor 978 adapted to control switching transistor 979 connected across the capacitor 972 to short-circuit the latter when the switch is turned on.

The A/D converter 907 feeds into a counter circuit 908 (see pages 668 and 683 of PULSE, DIGITAL AND SWITCHING WAVEFORMS) adapted to count the digital pulses produced by the converter 907 and having an output selector switch 909 whose function it is to select among the counter outputs.

A gate circuit 910 is connected through an amplifier 911 with the power switch 902 to control the switching operation of the latter. A multivibrator 912 is provided to set the off-time of the switch 902 at a level sufficient for gap dielectric recovery while an oscillator 913 provides clock pulses of a given frequency, e.g. 10 MHz, to a counter 914, the output of which is applied to a logic circuit 915 coupling the output of the gate circuit 910 with the output of the counter 914. A further coupling (logic) circuit 916 ties the output of circuit 915 to the output of the circuit 908 to provide a signal representative of a short-circuited gap, an arcing condition or another undesired condition of the machining gap. This signal is hereinafter referred to as "U" (unsatisfactory). A delay circuit 917, e.g. a monostable, multivibrator as described at pages 415 through 438 of PULSE, DIGITAL AND SWITCHING WAVEFORMS, delays for a period the output from the off-time timer 912 to the gate 910 to stretch the off-time of switch 902 on detection of a U signal. NAND gates and AND gates according to the present circuit are described at pages 330–334 and 317–321 of *PULSE, DIGITAL AND SWITCHING WAVEFORMS* respectively.

The sensing voltage 904 and the sense resistor 905 are continuously connected across the machining gap to monitor the gap current which varies in accordance with the gap resistance and provide an analog signal related to the gap current at the terminal 906. The terminal voltage at 906 is applied to the A/D converter 907 to charge the capacitor system at 973 such that when the threshold thereof is reached, the Schmitt circuit inverts to provide a 1 digital signal to the NAND gate 974; the NAND gate 974 has an 0 output which is inverted by the NOT gate 975 to 1 to cause the transistor 978 to be conductive through the 0 output of NAND circuit 977 and render transistor 979 conductive to short-circuit the capacitor 972.

The output of the NAND gate 974 is also applied to the monostable multivibrator 975 to begin a timing interval of 1 to 2 microseconds thereby providing to the NAND gate 977 an 0 signal to turn the NAND output to 1. Transistors 978 and 979 are turned off to permit the capacitor 972 to recharge with the input from terminal 906.

When the charging voltage on the capacitor 972 reaches the reference level established by the Schmitt circuit 973, inversion again occurs and the capacitor 972 is discharged.

The repetition of these operations results in the formation of digital pulses of a pulse width of 1 to 2 microseconds at the OUT terminal of the multivibrator 975. The frequency of these pulses is proportional to the analog signal detected at terminal 906. As the magnitude of the analog signal increases, the capacitor charges at an increased rate, which, in turn increases the frequency of the digital pulses of the output of monostable multivibrator 975.

The digital pulses thus generated are fed to the counter 908 which is reset when it counts up to the number of pulses established by the setting of the selector network 909 to thereby set the gate circuit 910. When pulses arrive at an increased frequency the counter 908 reaches its setting before the gate circuit 910 is set and, conversely, when the pulses arrive at a decreased frequency, the counter 908 takes longer to accumulate the preset counter and the gate circuit 901 arrives at its set condition before the count is complete.

While the gate circuit 910 is in its reset stage, the NOT gate or the inverter 910a, the NAND gate 910b and the NAND gate 910c have 0, 1, and 0 outputs respectively. When the signal from counter 908 indicates the selected count, these gates reverse their outputs to 1, 0, 1 respectively. Accordingly, the interval between the time at which the gate 910 is reset and the time at which it is set represents a gate pulse signal which is inverted at amplifier 911 and holds the power switch 902 in its conductive condition.

When the gate circuit 910 switches its output to 1 it triggers the monostable multivibrator 912 into operation and turns off the power switch 902 for the duration of operation of the multivibrator 912. The off-time is set at multivibrator 912 for a period sufficient to allow dielectric recovery of the gap from a preceding discharge.

Upon the lapse of this off-time, the NAND gate 910c in the gate circuit 910 receives a reset 1 signal from multivibrator 912 through circuit 917 to change its output to 0 and again turn on the power switch 902.

However, when the lapse of the off-time established by multivibrator 912 is not sufficient because of a sustained or arc discharge or short-circuiting at the gap, the delay network of circuit 917 is effective to stretch the off-time and prevent excessive application of the discharge current.

To this end, when the gate circuit 910 produces the output 1 the counter 914 is enabled to provide an 0 output which is inverted by a NOT gate or inverter 915a to provide an output 0 at the NAND gate 915b. The output of NAND gate 915c is thus 1. If there is a short-circuit or other excessively low impedance condition in the machining gap 901, an increased gap current will be detected and a higher-level analog signal will appear at the terminal 906. The pulses of converter 907 will increase in frequency and the counter 908 will reach the set count in a shorter time. As a result, the counter 908 provides an 0 signal before the counter 914 reaches its output value and the NAND gate 916a will apply a 1 output to the NAND gate 916b so that the latter will have an 0 output. The 0 output of the circuit 916 represents the "U" signal to indicate that the gap dielectric condition has not fully recovered from the preceding discharge. This signal is applied to the delay circuit 917 and delays the reset signal of gate circuit 910 for a period designed to increase the off-time as previously noted. During this off-time, the machining gap 1 may be adjusted as described in connection with FIG. 1A, or FIG. 1B to modify the gap width or replace the dielectric in the gap more rapidly, or, in general to correct a parameter of the gap and enable a normal machining condition to resume.

When the gate circuit 910 is reset to again turn power switch 902 on the machining gap 901 is ready for the next dielectric breakdown. The process is then repeated. When counter 908 counts the preset number of pulses the circuit 910 is set to turn the switch off and as a result substantially rectangular waveform machining pulses are obtained.

The determination of the pulse width is here made on a per pulse basis by counting pulses derived from a signal representing gap characteristics, checking the duration against a preset time interval to thereby modify the off-time of the system. The pulse width is thus made optimal for the gap conditions and stabilized machining is ensured.

Referring to FIG. 13, the overall approach of this circuit can be appreciated more readily. In general, an electric discharge is created upon the dielectric breakdown of the liquid dielectric flooding the machining gap. Before a full breakdown is reached a minute current flows which avalanches into the full breakdown. The preavalanche phenomenon is here detected by the monitoring circuit 904, 905 although minute and the terminal at 906 reflects the monitoring current which is converted into digital pulses accumulated by the counter 908. Upon initiation of the discharge, the gap monitoring voltage V as represented by the signal at terminal 906, has a buildup proportional to the discharge current buildup characteristics. In FIG. 13, the curves I, II and III represent respectively, rapid, moderate and slow buildup of the monitoring voltage depending upon the gap conductivity when the discharge is initiated. These analog signals are converted into digital signals respectively of high frequency, moderate frequency and low frequency. A similar variation is characteristic of the discharge and the frequency of the digital output pulses of the converter depends upon the varying magnitudes of the signal at terminal 906. The counter 908 counts up in a shorter time to provide a set signal to the gate circuit 910 to terminate the discharge with a narrower width in the case of the condition represented by the curve I. In the case of curve III, the 908 has an increased count time and hence increases the discharge pulse width. The digital signals are thus counted or integrated and the discharge pulse is cut off upon the integrating value reaching a given level. Discharge pulses of uniform energy are obtained and ready control of the system by the use of the selector switch 909 is provided.

The timer 913, 914 thus represents a checking timer for control of the delay circuit 917 to ascertain the off-time.

Figure 14:
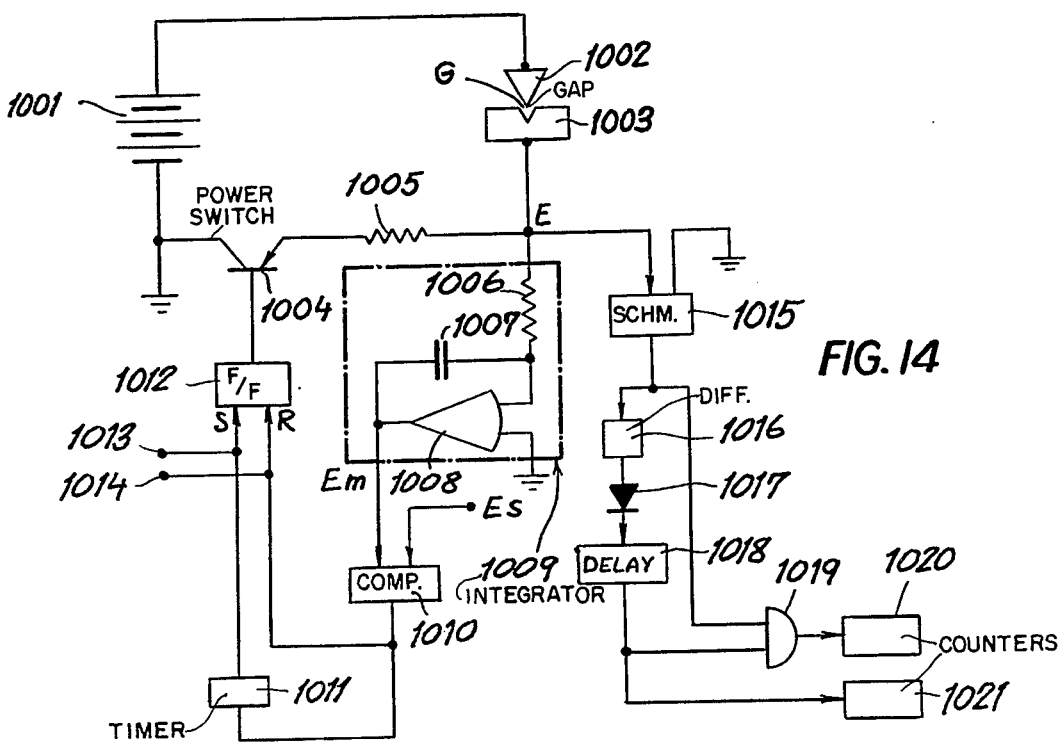
FIG. 14 is a block diagram illustrating another aspect of this invention.

FIG. 14 represents an embodiment of the invention which can be considered to constitute another modification of the integral control system previously described. In this circuit, the tool electrode 1002 and the workpiece 1003 are juxtaposed to form the gap G across which the machining power source 1001 is connected in series with an electronic on-off switch 1004 and a resistor 1005 which effectively can be tapped to derive a signal representing the discharge current.

A Miller integrator circuit 1009 (page 536 ff of PULSE, DIGITAL SWITCHNG AND WAVEFORMS) is connected to detect the discharge characteristics and is formed by a resistor 1006, a capacitor 1007 and, in parallel with the latter, an amplifier 1008. The output of the Miller integrator 1009 is applied to a comparator, the output of the comparator 1010 is applied to a timer 1011 establishing the pulse interval or off-time. A bistable device or flip-flop 1012 has a set terminal connected to the timer 1011 and a reset terminal R connected to the comparator 1010. Terminals 1013 and 1014 provide start and stop signals, respectively, for operation of the flip-flop.

A Schmitt-trigger circuit 1015 (FIG. 2) is also connected to the power circuit and has its output applied to a differentiator network 1016 (pages 38 to 42 of PULSE, DIGITAL AND SWITCHING WAVEFORMS) and to one input of a gate circuit 1019 which may either be an INHIBIT gate (pages 325 ff or PULSE, DIGITAL AND SWITCH WAVEFORMS) or an AND gate as will be described hereinafter. A diode 1017 is connected by the output of differentiator 1016 and a delay network 1018 adapted to establish a threshold discharge time duration $to$. The output from gate circuit 1019 is applied to a counter 1020 to count the output pulses of the gate circuit while another counter 1021 counts the output pulses of the delay network 18. These counters may have outputs to a system as described in my applications Ser. No. 272,463, now U.S. Pat. No. 3781507 and Ser. No. 338,849, now U.S. Pat. No. 387374, to control parameters of the gap as will be apparent hereinafter.

The gate circuit 1019 may either be an INHIBIT gate or an AND gate. Where an INHIBIT gate is used, the counter 20 selectively accumulates a count of discharge pulses whose durations are less than the threshold discharge duration $to$ established by the delay network 1018, namely, unfavorable pulses. Where the gate circuit 1019 is constituted by an AND gate, the counter 1020 is adapted to selectively count favorable pulses or machining pulses other than unfavorable pulses.

Before machining operation is initiated, the flip-flop 1012 is in the reset state so that there is no output therefrom. When the flip-flop 1012 receives a set signal from the starting command terminal 1013, it is switched to provide an output and trigger the switch 1004, the conduction thereby initiating the machining pulse substantially instantaneously. The discharge current traversing the gap and the switch 1004 induces a voltage E across the resistor proportional to the discharge current and applied as an input to the pulse duration control circuit and to the discrimination and counting circuit. The input to the Miller integrator 1009 is converted into a ramp voltage $EM = -E/RC\ t$ where $R$ is the resistance of resistor 1006, $C$ is the capacitance of capacitor 1007 and $t$ is the time. The ramp voltage is applied to the comparator 1010 when it reaches the reference level Es, provides a trigger pulse to reset the flip-flop and turn off switch 1004, thereby terminating the discharge. Simultaneously, the comparator output resets the integrator and triggers the timer 1001 into operation. The timer establishes a predetermined pulse interval in which the switch 1004 is held nonconductive and after this time, the set signal is applied from timer 1011 to the flip-flop so that a new discharge can commence. The energy content of each pulse may be selected by adjustment of the resistance of resistor 1006, the capacitance of capacitor 1007, the resistance of resistor 1005 and the gap short-circuiting current.

The voltage across the resistor 1005 also forms the input to the Schmitt trigger 1015 in which it is shaped into a rectangular waveform and the rectangular wave is applied to the gate circuit 1019 and to the differentiator 1016. The output of the differentiator 1016 is rectified by the diode 1017 to produce a signal representing the leading edge of such discharge pulse and forming an input to the delay network 1018 which produces a checking pulse. The checking pulse arrives at a time $to$ after receipt of the leading edge signal and a reply to both the gate circuit 1019 and the second counter 1021. When an INHIBIT gate is used, pulses of a duration less than the threshold value are accumulated in counter 1020 and where an AND gate is used, pulses of satisfactory duration are accumulated in counter 1020. Counter 1021 of course, counts all pulses and, when the ratio of unfavorable pulses to favorable pulses becomes excessive over a predetermined sequence of pulses, parameter adjustment is effected automatically in accordance with the principles set forth in the copending applications mentioned earlier.

The counter 1021 is cleared to starting when it has counted a given number of input pulses, e.g. ten, and counter 20 may likewise clear to start when it has counted a given number of input pulses less than that of counter 1020, say three where the gate 1019 passes unfavorable pulses. The counters 1020 and 1021 can be coupled so that clearing of counter 1021 resets counter 1020. Thus, when the counter 1020 has received three unfavorable pulses before receiving the clear signal, it provides an output used to control a gap parameter and restore proper EDM machining.

I have discovered that it is possible to utilize the aforedescribed principles for control of an electrical discharge machining apparatus by converting the analog signal representing a current through the gap during each machining discharge to a number of countable pulses.

Figure 15:
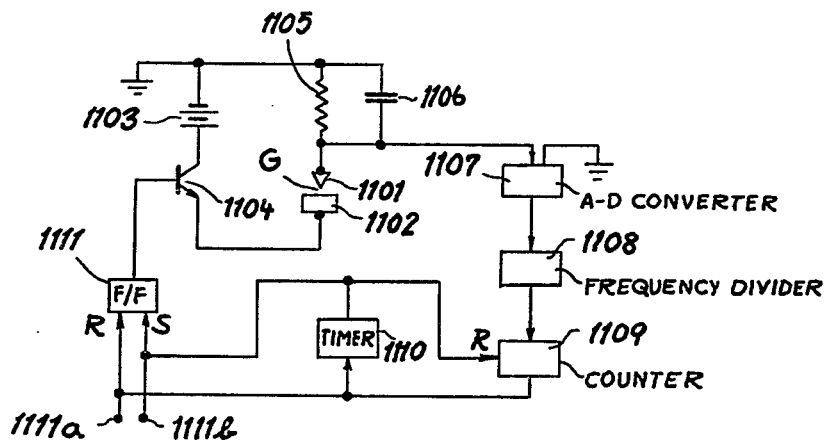
FIG. 15 is a block diagram of a circuit according to the invention in which integration occurs as a summation.

For example, in FIG. 15 I have shown a tool electrode 1101 which is spacedly juxtaposed with a workpiece 1102 across the machining gap G, the electrodes 1101, 1102 being connected in series with a direct current machining power source 1103 and a power switch 1104 here schematically shown as a transistor and described previously.

Figure 17:
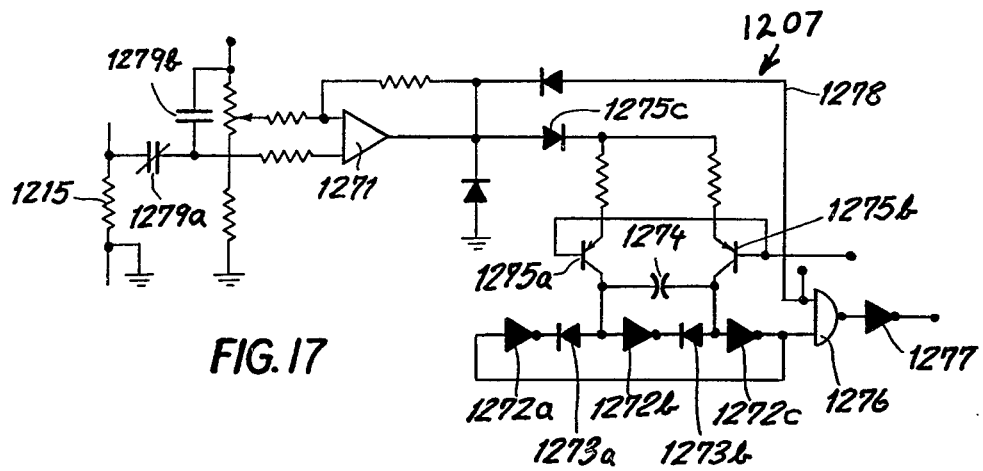
FIg. 17 is a circuit diagram of the converter of FIG. 15 or FIG. 16.

The discharge circuit also includes, in series with the gap, a resistor 1105 adapted to develop a voltage drop proportional to the gap-discharge current, the voltage being applied via the capacitor 1106 to an analog digital converter 1107 which may have the configuration illustrated in FIG. 17.

The analog digital converter 1107 generates pulses of a frequency which is a function of the input signal magnitude.

A frequency divider 1108 is connected to the output of the analog digital converter 1107 and provides an output adapted to be rejected in a presettable counter 1109 whose reset terminal is shown at R. The output from the counter 1109, when the latter reaches its preset count, is applied to a timer network 1110 defining the off-time of the system and with a flip-flop 1111 whose output energizes and controls (triggers) the power switch 1104 between a conductive and a nonconductive condition. The reset and set terminals of the flip-flop 1111 are represented respectively at R and S and the state of the flip-flop may be selected by applying a reset signal at terminal 1111a or a set signal to the terminal 1111b.

When the "start" command signal is received at the terminal 1111b, the flip-flop 1111 is set to provide an output 1 to turn the switch 1104 into a conductive state while resetting the counter 1109 by the input to its terminal R. A machining voltage from source 1103 is built up across the machining gap G to initiate a discharger therethrough. As soon as the discharge is initiated, resistor 1105 develops a voltage drop E which is proportional to the discharge current I. High-frequency components contained in the discharge are eliminated by the shunt capacitor 1106 and only the direct-current component is passed to the analog/digital converter 1107. The output of the latter has a frequency $f$ which is applied to the divider 1108 bringing the pulse rate down to a suitable countable rate.

The pulses from frequency divider 1108 are applied to counter 1109 which, upon registering the preset value, produces a short-duration signal pulse which is applied to the reset terminal R of flip-flop 1111 and thereby turns the switch 1104 off to terminate the discharge. The signal is also applied to the timer 1110, which may be a delay line so that the output pulse of the latter is applied after the lapse of the selected off-time, to the set terminal S of the flip-flop 1111 and thereby commences another discharge cycle by rendering the switch 1104 conductive. The output pulse from the timer 1110 is also applies to the reset terminal of counter 1109 to preset the latter.

The voltage E across the resistor 1105 is represented by $$E = I/k_1 \tag{1}$$

whereas the output frequency $f$ of the analog/digital converter 1107 is proportional to the voltage so that $$f = E/k_2 \tag{2}$$

where $k_1$ and $k_2$ are adjustable constants obtained by varying the resistance of resistor 1105 or adjusting the analog/digital converter 1107.

The dividing ratio of divider 1108 can be represented as $1/n$ and the preset number of counter 1109 is represented at N. The number of pulses N is a summation of the pulses received from the divider or $$N = \Sigma \frac{f}{n} \tag{3}$$

over a period $t$, equation (3) being equivalent to $$N = \int_o^t \frac{f}{n} dt \tag{4}$$

If equations (1) and (2) are substituted in equation (4), one obtains $$N = \int_o^t \frac{I}{k_1 k_2 n} \tag{5}$$

Solving for the current integral one obtains $$\int_o^t I\, dt = N k_1 k_2 n \tag{6}$$

Since N, $n$, $k_1$ and $k_2$ are all constants which may be adjusted with ease, the system may respond to any desired current integral and is particularly suited for accurate response to meet a wide range of machining requirements.

Figure 16:
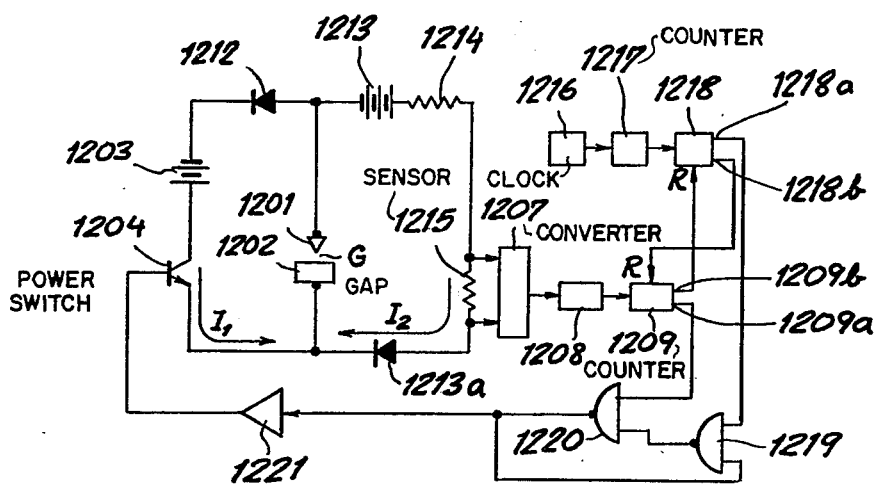
FIG. 16 is a block diagram of another gap-responsive control system using, as in FIG. 15, the variable frequency output of an analog/digital converter.

In FIG. 16 I have shown a circuit in which a high-voltage, low-current source 1213 is connected across the machining gap in series with a high ohmic resistor 1214 (current-limiting resistor) and a sensing resistor 1215. The discharge-initiating network also includes a diode 1213a permitting current flow only in the direction represented by the arrow $I_2$. The electrode 1201 and the workpiece 1202 define the machining gap G and also lie in series with the low-voltage high-current source 1203 and the electronic switch 1203 which is rendered conductive once breakdown has been effected in the gap by the voltage of source 1213. A diode 1212 is likewise included in the machining current circuit to confine the current flow to the direction represented by the arrow $I_1$. The diode 1212 blocks the high voltage of source 1213.

As in the embodiment of FIG. 15, the output of resistor 1215 is fed to an analog/digital converter 1207 whose output is applied to a frequency divider 1208 which feeds the counter 1209. In this embodiment, however, the off-time determination is made by a clock-pulse generator 1216, e.g. an oscillator, whose output is applied to a frequency divider 1217 which, in turn, feeds a counter 1218.

The high-voltage auxiliary source 1213 is connected continuously with the gap and has an output voltage which may be several times that of the machining power source 1203 which may have a potential of, say, 100 volts. During the time in which the switch 1204 is nonconductive, the source 1213 is capable of effecting the discharge but any discharge will disappear instantaneously because of the drop provided by the high omic resistor 1214 and does not cause any detriment to the machining process as long as there is no arcing at the gap. One or more insignificant discharges may take place during the off-time of switch 1204 without impeding the actual machining operation.

When switch 1204 is rendered conductive, gap breakdown by source 1214 is followed by a substantially instantaneous current flow forming the machining discharge from source 1203. Upon the turning off of power switch 1204 the machining discharge terminates and current flow through the gap from auxiliary source 1213 again becomes insignificant.

The advantage of the system of FIG. 16 over that of FIG. 15 is that power losses across the resistor 1105 of FIG. 15 are avoided. Furthermore, in order to permit the machining current to be at a high level, the resistor 1105 must have a relatively low value and this introduces the possibility of error. Furthermore, the actual current flow lags behind the discharge initiation slightly and the circuit of FIG. 16 responds immediately upon discharge initiation rather than awaiting the passage of the machining current.

The clock pulse generator of FIG. 16 provides a continuous output of clock pulses of a fixed and known frequency, the frequency divider 1217 transforming the clock pulses to a countable level. The counting pulses are applied to the counter 1218 which is of the preset type and is locked during the time in which the preset counter 1209 is effective, i.e. during passage of the machining current through the gap. Thus during this period the preset counter 1218 is effective to provide a 1 at its output terminal 1218a and 0 at its output terminal 1218b.

When preset counter 1209 has reached its preset count, the output 1209a develops a 1 state while its other output terminal 1209b yields a short-duration pulse which is applied to the reset terminal R of counter 1218 thereby releasing the locking state of the latter and permitting it to count incoming clock pulses.

The signal at terminal 1218a is thus switched to 0. When the counter 1218 has registered the preset number of clock pulses (after division) it switches to provide a 1 at output 1218a and terminal 1218b triggers a pulse which is applied to the reset terminal of counter 1209 and enables the latter to begin counting for the duration of the next discharge period.

While the counter 1209 has an 0 signal appearing at its output terminal 1209a or is in the counting state, a NAND gate 1220 receives this 0 signal at one input terminal and provides a 1 output regardless of whether its other terminal receives an 0 or a 1 input. The output signal of NAND gate 1220 is amplified at 1221 to turn on and hold the power switch 1204 in its conductive state.

When preset counter 1209 registers its preset value the terminal 1209a develops a 1 while the terminal 1218a is switched to 0, the output of NAND gate 1219 is switched to 1 and triggers the NAND gate 1220 into its 0 output state, thereby turning switch 1204 off to terminate the discharge.

The switch 1204 is held off until counter 1218 has accumulated the preset number of incoming clock pulses. The off-time is thus determined and adjusted by the controlling output frequency of the clock pulse generator 1216, the divider ratio of divider 1217 and the preset count of counter 1218.

FIG. 17 shows an analog/digital converter 1107 or 1207 for producing pulses of a frequency proportional to the input voltage. In this embodiment, the resistor 1215 develops a direct current voltage whose magnitude is proportional to the varying discharge current traversing the machining gap as noted previously. This voltage is applied to an operational amplifier 1271 adapted to develop a voltage at its output with zero input or zero discharge current through the gap. The output of the operational amplifier 1271 is supplied to an oscillator adapted to provide pulses of a given frequency as long as it receives an input; the frequency, however, is modified in accordance with the output voltage of amplifier 1271.

The oscillator comprises NOT gates or inverters 1272a and 1272b, 1272c and diodes 1273a and 1273b form a series circuit with the diodes poled in one direction and alternating with the inverters. A capacitor 1274 is connected across the input of NOT gate 1272b and the input of diode 1273b while a pair of transistors 1275a and 1275b have their emitters coupled by this capacitor, their bases conductively connected and their emitter tied by bias resistors and a forwardly biased diode 1275c to the output of the operational amplifier 1271.

The output of the oscillator is fed to a first input terminal of a NAND gate 1276 whose output is fed via an inverter or NOT gate 1277 to the divider 1208 or directly to the counter 1209 previously described. The NAND gate 1276 has a second input 1278 which is adapted to receive an 0 signal to disable the gate when no input signal appears at sensing resistor 1215, i.e. when no discharge current traverses the gap and there is null leakage current.

When a discharge current signal is sensed at resistor 1215, the operational amplifier 1271 has an input voltage which continuously varies in accordance with the voltage drop at resistor 1215 and hence in accordance with the magnitude of the discharge current. The output frequency of the oscillator is thus a function of the current. The second input 1278 of NAND gate 1276 enables the circuit to pass the variable frequency output as soon as a signal develops in the machining gap. Contact 1279a and 1279b represent relay contacts which may be provided to switch the oscillator between a variable frequency and a constant frequency mode. Thus if contacts 1279a are opened and contacts 1279 are closed, the system will act as a constant frequency oscillator.

Figure 18:
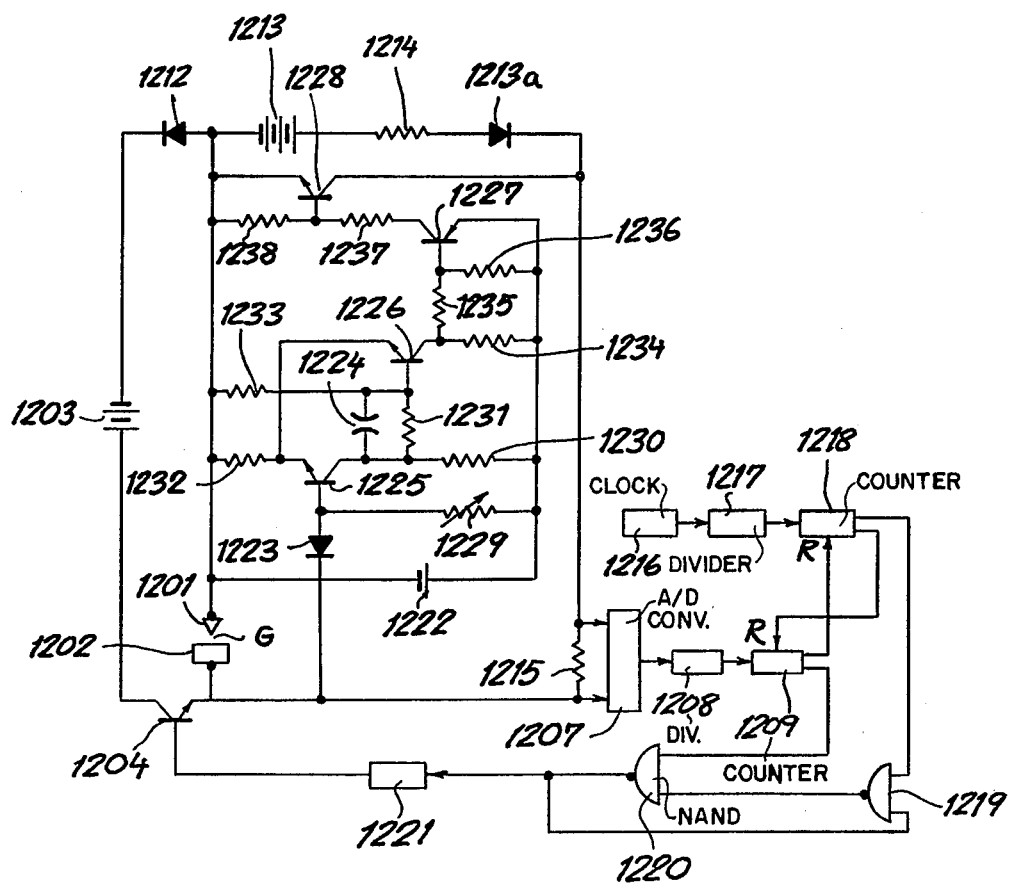
FIG. 18 is a circuit diagram of still another control system using an analog/digital converter.

In FIG. 18, I have shown a circuit which is generally similar to FIG. 16 but has an additional gap monitor as will be apparent. As in the embodiment of FIG. 16, this circuit comprises a tool electrode 1201, a workpiece 1202 spaced therefrom across the machining gap G, a power switch 1204 in series with the gap and a machining power supply 1203 and a diode 1212 in this power circuit.

In the discharge initiating circuit there is, as previously described, a high-voltage low-current source 1213, a current limiting resistor 1214, the diode 1213a and the sensing resistor 1215. In addition, the clock pulse generator 1216, the divider 1217, the delay-setting counter 1218, the NAND gates 1219 and 1220, the amplifier 1221, the analog/digital converter 1207 (FIG. 17) the divider 1208 and the counter 1209 all are connected as has been described in connection with FIGS. 16 and 17.

The gap monitoring circuit provided here in addition is designed such that, when the gap voltage falls below a predetermined threshold value, say 12 volts, the high voltage source is shunted from the machining gap.

The shunt circuit comprises a transistor 1228 of the NPN type whose emitter-collector terminals bridge the network consisting of source 1213 resistor 1214 and diode 1213a. The base of transistor 1228 is connected between resistor 1237 and 1238 of a voltage divider tied between the positive terminal of a direct current source and the collector of a PNP transistor 1227. The base signal is applied to this transistor from the collector of another NPN transistor 1226, via a resistor 1234, the emitter of transistor 1226 being connected to the emitter of transistor 1225 whose collector is tied to the base of transistor 1226 via the RC network consisting of a capacitor 1224 and a resistor 1231. A reverse-biased diode 1229 leads from the base of transistor 1225 to the electrode terminal of the system. The unit also, as shown, shunts the main source 1203 simultaneously.

As long as normal machining proceeds in the gap G, there is substantially no voltage drop and hence the aforedescribed threshold level is not passed, the high voltage source being continuously connected during discharge or the discharge interval. However when a short-circuit occurs in the gap, the voltage across the latter will fall below the threshold and the same holds true when continuous arcing conditions develop.

Under normal operating conditions, the transistor 1225 is maintained conductive by a voltage source 1222 and transistors 1226, 1227 and 1228 are consequently non-conductive. The resistance of resistor 1229 in the bias network of transistor 1225 is adjusted such that, when the gap voltage drops below the threshold of 12 volts, the transistor 1225 becomes non-conductive and transistors 1226, 1227 and 1228 are rendered conductive. The source 1213 is thereby shunted. Upon recovery of the gap voltage to a level above 12 volts, transistor 1225 is returned to the conductive state. Bias resistors are provided in accordance with the usual practice at 1230 through 1237.

I claim:

1. A method of controlling the machining of a workpiece by the application of machining pulses across a dielectric-swept gap between said workpiece and an electrode spacedly juxtaposed therewith, the method comprising the steps of:
   switching a machining current power supply on and off in circuit with said gap to apply machining discharges thereacross;
   integrating a signal representing the gap current passing through said gap after initiation of a discharge thereacross to produce a control signal; and
   effecting the switching of said power supply upon the magnitude of said signal attaining predetermined value, said control signal being produced by converting a signal representing the gap current into a train of digital pulses and integrating said train of digital pulses.

2. The method defined in claim 1 wherein said pulses of said train are accumulated in a counter to produce said control signal.

3. A method of controlling the machining of a workpiece by the application of machining pulses across a dielectric-swept gap between said workpiece and an electrode spacedly juxtaposed therewith, the method comprising the steps of:
   switching a machining current power supply on and off in circuit with said gap to apply machining discharges thereacross;
   integrating a signal representing the gap current passing through said gap after initiation of a discharge thereacross to produce a control signal;
   effecting the switching of said power supply upon the magnitude of said signal attaining predetermined value;
   timing the duration of each machining discharge;
   counting the number of unsatisfactory machining discharges having a duration less than a predetermined duration over a predetermined number of sequential machining discharges; and
   modifying a parameter of said gap upon the count of unsatisfactory machining discharges exceeding a predetermined number.

4. A method of controlling the machining of a workpiece by the application of machining pulses across a dielectric-swept gap between said workpiece and an electrode spacedly juxtaposed therewith, the method comprising the steps of:
   switching a machining current power supply on and off in circuit with said gap to apply machining discharges thereacross;
   integrating a signal representing the gap current passing through said gap after initiation of a discharge thereacross to produce a control signal;
   effecting the switching of said power supply upon the magnitude of said signal attaining predetermined value;
   timing the duration of each machining discharge;
   counting the number of satisfactory machining discharges having a duration within a predetermined duration range and thereby ascertaining the number of unsatisfactory discharges having a duration outside said range; and
   modifying a parameter of said gap upon ascertaining unsatisfactory discharges exceeding a predetermined amount.

5. In a system for the electric discharge machining of a workpiece by an electrode juxtaposed therewith across a dielectric-filled gap, the improvement which comprises in combination:
   an electric-current source;
   on-off switch means connected in circuit with said source, said workpiece and said electrode and triggerable to apply substantially rectangular-wave machining-current pulses to said gap to effect electrical discharge thereacross;
   an integrator adapted to generate a control signal representing the integral of a current flow through said gap;
   means responsive to said integrator for operating said switch means upon said signal attaining a predetermined value;
   means for detecting the duration of the successive discharges formed by the repetitive operation of said switch means;
   means for determining unsatisfactory discharges of a duration outside a predetermined duration range; and
   means for producing a signal for controlling a parameter of the gap upon the number of unsatisfactory discharges exceeding a predetermined number over a sequence of predetermined number of discharges.

6. The improvement defined in claim 5 wherein said means for producing a signal for controlling said parameter includes a counter for accumulating a count of the number of satisfactory discharges for forming the latter signal.

7. The improvement defined in claim 5 wherein said means for producing a signal for controlling said parameter includes a counter for accumulating a count of the number of unsatisfactory discharges.

8. The improvement defined in claim 5 wherein said means for determining discharges of a duration outside said range includes a timer energized at the leading flank of each discharge, gating means responsive to said timer, and a counter connected in circuit with said gating means for accumulating a count of discharges.

* * * * *